(12) United States Patent
Fujishiro

(10) Patent No.: US 9,100,865 B2
(45) Date of Patent: Aug. 4, 2015

(54) RADIO TERMINAL AND CONTROL METHOD

(75) Inventor: Masato Fujishiro, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 81 days.

(21) Appl. No.: 14/003,763

(22) PCT Filed: Mar. 7, 2012

(86) PCT No.: PCT/JP2012/055874
§ 371 (c)(1),
(2), (4) Date: Sep. 6, 2013

(87) PCT Pub. No.: WO2012/121303
PCT Pub. Date: Sep. 13, 2012

(65) Prior Publication Data
US 2013/0344814 A1    Dec. 26, 2013

(30) Foreign Application Priority Data

Mar. 8, 2011 (JP) ................................. 2011-050585
Mar. 8, 2011 (JP) ................................. 2011-050588
Mar. 8, 2011 (JP) ................................. 2011-050611
Mar. 8, 2011 (JP) ................................. 2011-050613

(51) Int. Cl.
*H04B 17/00* (2006.01)
*H04W 24/08* (2009.01)
(Continued)

(52) U.S. Cl.
CPC .............. *H04W 24/08* (2013.01); *H04B 17/24* (2015.01); *H04B 17/318* (2015.01); *H04W 24/10* (2013.01); *H04W 88/02* (2013.01)

(58) Field of Classification Search
CPC ....... H04B 17/00; H04W 24/00; H04W 24/10
USPC ........ 455/67.11, 73, 130, 226.1, 226.2, 226.3
See application file for complete search history.

(56) References Cited

U.S. PATENT DOCUMENTS 6,438,377 B1 *   8/2002   Savolainen .................... 455/439
7,430,432 B2 *   9/2008   Tapaninen et al. ............. 455/522
(Continued)

FOREIGN PATENT DOCUMENTS

EP        2200352 A1      6/2010
JP     2005-101971 A      4/2005
(Continued)

OTHER PUBLICATIONS

An Office Action; "Notice of Reasons for Rejection," issued by the Japanese Patent Office on Nov. 11, 2014, which corresponds to Japanese Patent Application No. 2011-050588 and is related to U.S. Appl. No. 14/003,763; with English language statement of relevance.
(Continued)

Primary Examiner — Tuan Pham
(74) Attorney, Agent, or Firm — Studebaker & Brackett PC

(57) ABSTRACT

A radio terminal according to one embodiment comprises a radio communication unit 110 capable of performing radio communication with E-UTRAN, a measurement unit 120 that measures RSRP from the E-UTRAN, and a control unit 150 that performs a control so that measurement data including information related to RSRP measured by the measurement unit 120 and location information at the time of measurement is reported to the E-UTRAN, wherein when a rapid change of RSRP measured by the measurement unit 120 is detected, the control unit 150 performs control so that measurement data corresponding to RSRP indicating the rapid change is excluded from a target to be reported to the E-UTRAN.

22 Claims, 9 Drawing Sheets

(51) Int. Cl.
  *H04B 17/24* (2015.01)
  *H04B 17/318* (2015.01)
  *H04W 88/02* (2009.01)
  *H04W 24/10* (2009.01)

(56) References Cited

U.S. PATENT DOCUMENTS

| | | | |
|---|---|---|---|
| 8,572,442 | B2 | 10/2013 | Oyama |
| 2010/0208707 | A1 | 8/2010 | Hamabe et al. |
| 2010/0251038 | A1 | 9/2010 | Oyama |
| 2010/0311415 | A1 | 12/2010 | Hamabe et al. |

FOREIGN PATENT DOCUMENTS

| | | |
|---|---|---|
| JP | 2009-164876 A | 7/2009 |
| JP | 2010-226400 A | 10/2010 |

OTHER PUBLICATIONS

3GPP; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 9)"; 3GPP TS 36.300; Dec. 2010; pp. 58-59; V9.6.0.
An Office Action; "Notice of Reasons for Rejection," issued by the Japanese Patent Office on Aug. 19, 2014, which corresponds to Japanese Patent Application No. 2011-050585 and is related to U.S. Appl. No. 14/003,7663; with English language statement of relevance.
An Office Action; "Notice of Reasons for Rejection," issued by the Japanese Patent Office on Aug. 19, 2014, which corresponds to Japanese Patent Application No. 2011-050588 and is related to U.S. Appl. No. 14/003,763; with English language statement of relevance.
An Office Action; "Notice of Reasons for Rejection," issued by the Japanese Patent Office on Aug. 19, 2014, which corresponds to Japanese Patent Application No. 2011-050611 and is related to U.S. Appl. No. 14/003,763; with English language statement of relevance.
An Office Action; "Notice of Reasons for Rejection," issued by the Japanese Patent Office on Aug. 19, 2014, which corresponds to Japanese Patent Application No. 2011-050613 and is related to U.S. Appl. No. 14/003,763; with English language statement of relevance.
3GPP TR 36.805 V9.0.0 (Dec. 2009); 3rd Generation Partnership Project; Technical Specification Group Radio Access Network; Study on Minimization of drive-tests in Next Generation Networks; (Release 9).
3GPP TS 37.320 V10.0.0 (Dec. 2010); 3rd Generation Partnership Project; Technical Specification Group Radio Access Network; Universal Terrestrial Radio Access (UTRA) and Evolved Universal Terrestrial Radio Access (E-UTRA); Radio measurement collection for Minimization of Drive Tests (MDT); Overall description; Stage 2 (Release 10).
International Search Report; PCT/JP2012/055874; Apr. 3, 2012.
An Office Action issued by the Korean Patent Office on Oct. 23, 2014, which corresponds to Korean Patent Application No. 10-2013-7023784 and is related to U.S. Appl. No. 14/003,763; with English language concise explanation.
3GPP; "MDT Measurement configurations"; 3GPP TSG RAN WG2 Meeting #69bis; R2-102140; Apr. 12-16, 2010; Beijing, China.
The extended European search report issued by the European Patent Office on Dec. 15, 2014, which corresponds to European Patent Application No. 12755682.7-1854 and is related to U.S. Appl. No. 14/003,763.
Communication pursuant to Rules 70(2) and 70a(2) EPC issued by the European Patent Office on Jan. 12, 2015, which corresponds to European Patent Application No. 12755682.7-1854 and is related to U.S. Appl. No. 14/003,763.
Research in Motion et al.; "Logged MDT measurement configurations"; 3GPP TSG RAN WG2 Meeting #70bis; R2-103769; Jun. 28-Jul. 2, 2010; Stockholm, Sweden.
Top Optimized Technologies; Study or Work Item proposal for Outer Loop Power Control (OLPC) convergence speed (Downlink System Level simulations); TSG-RAN Working Group 4 Meeting #36; R4-051038; Aug. 29-Sep. 2, 2005; London, U.K.

* cited by examiner

RADIO TERMINAL AND CONTROL METHOD

TECHNICAL FIELD

The present invention relates to a radio terminal supporting MDT and a control method.

BACKGROUND ART

In a mobile communication system, a received-signal state (for example, received power and reception quality) within an area of a base station changes as a result of a building being constructed within the area, and the like. Thus, an operator conducts a drive test for collecting location information at the time of measurement while measuring a received-signal state by using a vehicle for measurement loading thereon measurement equipment.

When the operator discovers a location or an area where a received-signal state deteriorates (that is, a coverage problem) through the drive test, the operator performs network optimization for resolving the discovered coverage problem. Herein, network optimization refers to, for example, changing a parameter of a base station, and newly installing a base station.

The drive test has the problem of too many man-hours and high cost. Thus, according to 3GPP (3rd Generation Partnership Project), which is a project aiming to standardize mobile communication systems, the standards determination of MDT (Minimization of Drive Test) for automation of measurement of a received-signal state and collection of location information, is being progressed by using a radio terminal belonging to a user (see Non Patent Literatures 1 and 2).

The radio terminal set (configured) to perform MDT measures a received-signal state and reports, to a mobile communication network, measurement data including information related to the measurement results and location information at the time of measurement. MDT performed when a radio terminal is communicating is referred to as immediate report type (Immediate MDT), and MDT performed when a radio terminal is in a standby state is referred to as record-type (logged MDT).

PRIOR ART DOCUMENT

Non-Patent Document

Non-patent Document 1: 3GPP TR 36.805 V9.0.0: "Study on Minimization of drive-tests in Next Generation Networks", 2009-12

Non-patent Document 2: 3GPP TS 37.320 V10.0.0: "Radio measurement collection for Minimization of Drive Tests (MDT); Overall description; Stage 2", 2010-12.

SUMMARY OF THE INVENTION

By the way, there is a certain coverage problem that cannot be resolved, even when normal network optimization is performed, depending on a factor that causes a received-signal state to deteriorate. For example, it is not possible to resolve a problem that a received-signal state rapidly deteriorates when a radio terminal moves into an elevator and the door is closed, even when normal network optimization is performed.

Thus, it is preferable that the coverage problem be excluded from a target for network optimization. However, even measurement data related to the coverage problem is reported to a mobile communication network from a radio terminal in the current standards of MDT and thus, there is a concern that inappropriate network optimization is induced. In addition, it is not preferable that a load of a radio terminal and the amount of consumption of radio resources increase when the unnecessary measurement data is reported to the mobile communication network.

Therefore, an object of the present invention is to provide a radio terminal with which it is possible to avoid induction of inappropriate network optimization and an increase in load and amount of resource consumption, and to provide a control method.

To solve the above problems, the present invention includes the following characteristics.

A characteristic of a radio terminal according to the present invention, is summarized as comprising a radio communication unit (a radio communication unit 110) capable of performing radio communication with a mobile communication network (for example, E-UTRAN 10); a measurement unit (a measurement unit 120) that measures a received-signal state from the mobile communication network; and a control unit (a control unit 150) that performs a control so that measurement data including information related to the received-signal state measured by the measurement unit and location information at the time of measurement is reported to the mobile communication network, wherein when a rapid change (for example, deterioration) of the received-signal state measured by the measurement unit is detected, the control unit performs control so that measurement data corresponding to the received-signal state indicating the rapid change is excluded from a target to be reported to the mobile communication network.

According to such a characteristic, the radio terminal excludes measurement data corresponding to a received-signal state indicating a rapid change, from a target to be reported to a mobile communication network, when the rapid change of the received-signal state is detected. This makes it possible, for example, to eliminate a need of reporting, to a mobile communication network, the measurement data related to a coverage problem that received-signal state rapidly decreases when the radio terminal moves into an elevator and the door is closed, and therefore, it is possible to exclude the coverage problem from a target for network optimization. Accordingly, the radio terminal according to the characteristic can avoid induction of inappropriate network optimization and increases in load and amount of resource consumption.

In the characteristic, another characteristic of the radio terminal according to the present invention is summarized as the rapid change of the received-signal state indicates that a power level of a reception signal from the mobile communication network decreases by a predetermined amount within a predetermined time period.

In the characteristic, another characteristic of the radio terminal according to the present invention is summarized as the control unit performs a control so that the measurement data is reported to the mobile communication network when a reporting condition is satisfied, the reporting condition is that a time period at which the power level of the reception signal is below a threshold value exceeds a certain time period, and the predetermined time period is shorter than the certain time period.

In the characteristic, another characteristic of the radio terminal according to the present invention is summarized as the control unit performs a control so that a state in which the report of the measurement data to the mobile communication network is suspended is continued after the power level of the reception signal decreases by the predetermined amount within the predetermined time period until the power level of the reception signal exceeds a threshold value.

In the characteristic, another characteristic of the radio terminal according to the present invention is summarized as the measurement of the received-signal state and the report of the measurement data are performed in a state in which the radio terminal is performing communication.

In the characteristic, another characteristic of the radio terminal according to the present invention is summarized as further comprising a storage unit (a storage unit 140), wherein the control unit performs a control so that the measurement data including information related to the received-signal state measured by the measurement unit and location information at the time of measurement is recorded in the storage unit, and then the measurement data recorded in the storage unit is reported to the mobile communication network, and when a rapid change (for example, deterioration) of the received-signal state measured by the measurement unit is detected, the control unit excludes measurement data corresponding to the received-signal state indicating the rapid change, from a target to be recorded in the storage unit.

According to such a characteristic, when a rapid change of a received-signal state is detected, the radio terminal excludes measurement data corresponding to the received-signal state indicating the rapid change, from a target to be recorded in the storage unit. As a result, it is possible, for example, to eliminate a need of reporting, to a mobile communication network, the measurement data related to a coverage problem that received-signal state rapidly decreases when the radio terminal moves into an elevator and the door is closed, and therefore, it is possible to exclude the coverage problem from a target for network optimization. Accordingly, the radio terminal according to the characteristic can avoid induction of inappropriate network optimization and increases in load and amount of resource consumption. In addition, a storage capacity of the storage unit can be saved.

In the characteristic, another characteristic of the radio terminal according to the present invention is summarized as the rapid change of the received-signal state indicates that a power level of a reception signal from the mobile communication network decreases by a predetermined amount within a predetermined time period.

In the characteristic, another characteristic of the radio terminal according to the present invention is summarized as the control unit performs a control so that the measurement data is recorded in the storage unit when a recording condition is satisfied, the recording condition is a completion of measurement over a certain time period after a power level of the reception signal falls below a threshold value, and the predetermined time period is shorter than the certain time period.

In the characteristic, another characteristic of the radio terminal according to the present invention is summarized as the control unit performs a control so that a state in which the record of the measurement data in the storage unit is suspended is continued after the power level of the reception signal decreases by the predetermined amount within the predetermined time period until the power level of the reception signal exceeds a threshold value.

In the characteristic, another characteristic of the radio terminal according to the present invention is summarized as the measurement of the received-signal state and the record of the measurement data are performed in a standby state of the radio terminal.

In the characteristic, another characteristic of the radio terminal according to the present invention is summarized as further comprising a storage unit (a storage unit 140), wherein the control unit performs a control so that the measurement data including information related to the received-signal state measured by the measurement unit and location information at the time of measurement is recorded in the storage unit, and then the measurement data recorded in the storage unit is reported to the mobile communication network, and when a rapid change (for example, deterioration) of the received-signal state measured by the measurement unit is detected, the control unit deletes all measurement data recorded in the storage unit.

According to such a characteristic, when a rapid change of a received-signal state is detected, the radio terminal deletes all measurement data recorded in the storage unit. As a result, it is possible, for example, to eliminate a need of reporting, to a mobile communication network, the measurement data related to a coverage problem that received-signal state rapidly decreases when the radio terminal moves into an elevator and the door is closed, and therefore, it is possible to exclude the coverage problem from a target for network optimization. Accordingly, the radio terminal according to the characteristic can avoid induction of inappropriate network optimization and increases in load and amount of resource consumption. In addition, a storage capacity of the storage unit can be saved.

In the characteristic, another characteristic of the radio terminal according to the present invention is summarized as the rapid change of the received-signal state indicates that a power level of a reception signal from the mobile communication network decreases by a predetermined amount within a predetermined time period.

In the characteristic, another characteristic of the radio terminal according to the present invention is summarized as the control unit performs a control so that the measurement data is recorded in the storage unit in accordance with a recording condition, the recording condition is that a record is performed over a certain time period after a power level of the reception signal falls below a threshold value, and the predetermined time period is shorter than the certain time period.

In the characteristic, another characteristic of the radio terminal according to the present invention is summarized as the measurement of the received-signal state and the record of the measurement data are performed in a standby state of the radio terminal.

In the characteristic, another characteristic of the radio terminal according to the present invention is summarized as further comprising a storage unit (a storage unit 140), wherein the control unit performs a control so that the measurement data including information related to the received-signal state measured by the measurement unit and location information at the time of measurement is recorded in the storage unit, and then the measurement data recorded in the storage unit is reported to the mobile communication network, and when a rapid change (for example, deterioration) of the received-signal state measured by the measurement unit is detected, the control unit deletes measurement data corresponding to the received-signal state indicating the rapid change among measurement data recorded in the storage unit.

According to such a characteristic, when a rapid change of a received-signal state is detected, the radio terminal deletes measurement data corresponding to the received-signal state indicating the rapid change among measurement data recorded in the storage unit. As a result, it is possible, for example, to eliminate a need of reporting, to a mobile communication network, the measurement data related to a coverage problem that received-signal state rapidly decreases when the radio terminal moves into an elevator and the door is closed, and therefore, it is possible to exclude the coverage problem from a target for network optimization. Accordingly, the radio terminal according to the characteristic can avoid induction of inappropriate network optimization and increases in load and amount of resource consumption. In addition, a storage capacity of the storage unit can be saved.

In the characteristic, another characteristic of the radio terminal according to the present invention is summarized as the rapid change of the received-signal state indicates that a power level of a reception signal from the mobile communication network decreases by a predetermined amount within a predetermined time period.

In the characteristic, another characteristic of the radio terminal according to the present invention is summarized as the control unit performs a control so that the measurement data is recorded in the storage unit in accordance with a recording condition, the recording condition is that a record is performed over a certain time period after a power level of the reception signal falls below a threshold value, and the predetermined time period is shorter than the certain time period.

In the characteristic, another characteristic of the radio terminal according to the present invention is summarized as the measurement of the received-signal state and the record of the measurement data are performed in a standby state of the radio terminal.

A characteristic of a control method according to the present invention is summarized as a control method of controlling a radio terminal with which it is possible to perform radio communication with a mobile communication network, the control method comprising a measurement step of measuring a received-signal state from the mobile communication network; and a control step of performing a control so that measurement data including information related to a received-signal state measured in the measurement step and location information at the time of the measurement is reported to the mobile communication network, wherein the control step includes an exclusion step of performing a control so that measurement data corresponding to a received-signal state indicating a rapid change is excluded from a target to be reported to the mobile communication network when the rapid change of the received-signal state measured in the measurement step is detected.

In the characteristic, another characteristic of the control method according to the present invention is summarized as the control step includes a recording step of recording the measurement data including information related to a received-signal state measured in the measurement step and location information at the time of the measurement; and a reporting step of reporting the measurement data recorded in the recording step to the mobile communication network, and the exclusion step includes a step of excluding measurement data corresponding to a received-signal state indicating a rapid change, from a target to be recorded in the recording step, when the rapid change of the received-signal state measured in the measurement step is detected.

In the characteristic, another characteristic of the control method according to the present invention is summarized as the control step includes a recording step of recording the measurement data including information related to a received-signal state measured in the measurement step and location information at the time of the measurement, and a reporting step of reporting the measurement data recorded in the recording step to the mobile communication network, and the exclusion step includes a step of deleting all measurement data recorded in the recording step when a rapid change of the received-signal state measured in the measurement step is detected.

In the characteristic, another characteristic of the control method according to the present invention is summarized as the control step includes a recording step of recording the measurement data including information related to a received-signal state measured in the measurement step and location information at the time of the measurement, and a reporting step of reporting the measurement data recorded in the recording step to the mobile communication network, and the exclusion step includes a step of deleting measurement data corresponding to a received-signal state indicating a rapid change among measurement data recorded in the recording step when the rapid change of the received-signal state measured in the measurement step is detected.

DESCRIPTION OF THE EMBODIMENT

First Embodiment

With regard a first embodiment of the present invention, (1) Overview of mobile communication system, (2) Configuration of radio terminal, (3) Operation of radio terminal, (4) Effect of embodiments, and (5) Modifications will be sequentially described with reference to drawings.

(1) Overview of Mobile Communication System

Figure 1:
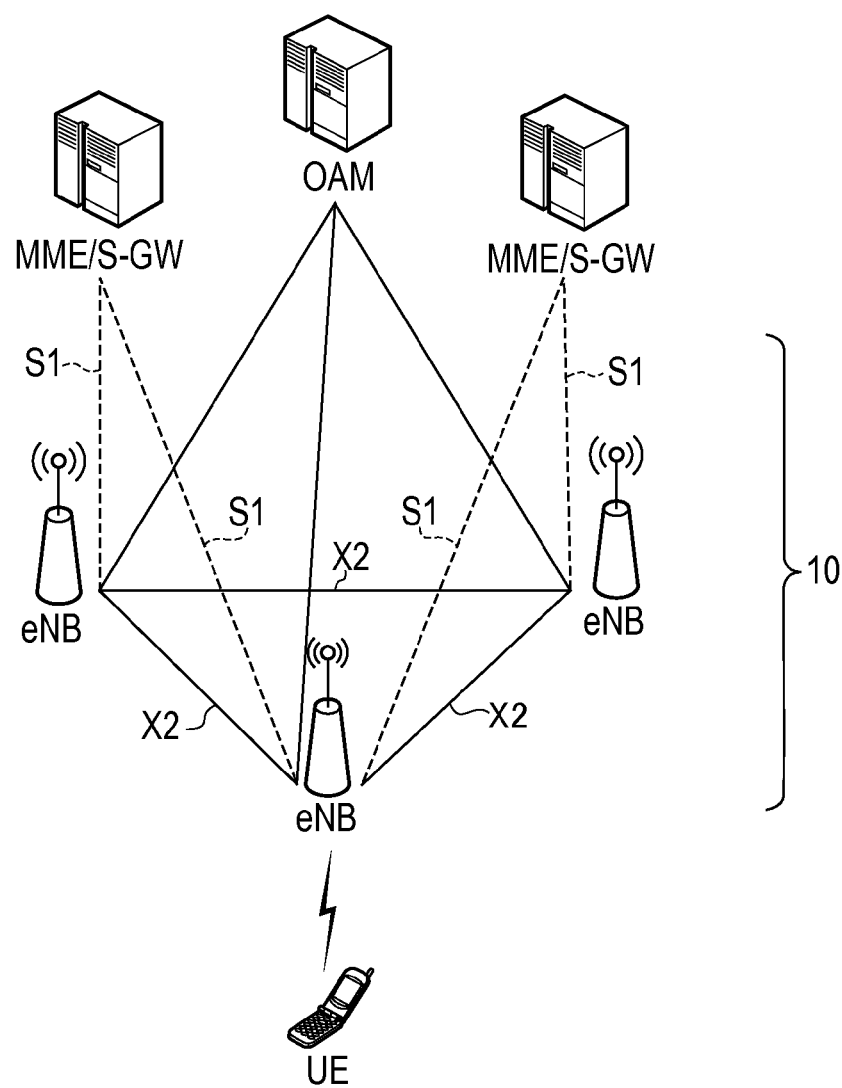
FIG. 1 is a diagram showing an entire schematic configuration of mobile communication systems according to a first embodiment to a fourth embodiment.

FIG. 1 is an entire schematic configuration diagram of a mobile communication system 1 according to the present embodiment. The mobile communication system 1 is configured on the basis of LTE (Long Term Evolution), standards of which have been designed in 3GPP, and supports the above described Immediate MDT.

As illustrated in FIG. 1, the mobile communication system 1 includes a radio terminal UE, E-UTRAN (Evolved-UMTS Terrestrial Radio Access Network) 10, a mobile management device MME/gateway device S-GW, and a maintenance monitoring device OAM. The E-UTRAN 10 is a mobile communication network configured by a plurality of base stations eNB.

The radio terminal UE is a transportable radio communication device belonging to a user. The radio terminal UE is configured to connect to one of the base stations eNB constituting the E-UTRAN 10 (including a case where the radio terminal UE connects thereto via a relay device, or connects to a relay device), and enable communication with a communication destination via the base station eNB. A state in which the radio terminal UE is performing communication is referred to as a connected mode.

Each base station eNB is a fixed radio communication device set up by an operator, and is configured to perform radio communication with the radio terminal UE. Each base station eNB performs communication with the mobile management device MME/gateway device S-GW, and communication with the maintenance monitoring device OAM via a backhaul.

The mobile management device MME is configured to perform various mobility controls for the radio terminal UE, and the gateway device S-GW is configured to perform transfer control of user data transmitted and received by the radio terminal UE.

The maintenance monitoring device OAM is a server device set up by an operator, and is configured to perform maintenance and monitoring of the E-UTRAN 10.

In the present embodiment, for example, the base station eNB which is a connection destination of the radio terminal UE transmits information for setting Immediate MDT in the radio terminal UE to the radio terminal UE in response to an instruction from the maintenance monitoring device OAM.

The radio terminal UE set to perform Immediate MDT measures a received-signal state from the E-UTRAN 10, and reports measurement data to the E-UTRAN 10 in the connected mode. Hereinafter, processing of appropriately generating measurement data by the radio terminal UE is referred to as "measurement and collection".

In addition, reference signal received power (RSRP) as an index of a received-signal state is used in the present embodiment. However, reference signal received quality (RSRQ) may be used together with RSRP.

Measurement data includes information related to a measurement result and location information at the time of measurement. For example, the information related to a measurement result is information indicating RSRP for each cell of one or a plurality of base stations eNB. The location information is GPS/GNSS location information when the radio terminal UE has a GPS/GNSS function, and is RF fingerprint information when the radio terminal UE does not have a GPS receiving function.

The base station eNB receiving measurement data from the radio terminal UE transfers the received measurement data to the maintenance monitoring device OAM. If the maintenance monitoring device OAM discovers a coverage problem on the basis of the measurement data acquired in this way, the maintenance monitoring device OAM automatically performs network optimization for notifying an operator of the discovered coverage problem or solving the discovered coverage problem.

When Immediate MDT is set in the radio terminal UE, the base station eNB performing the setting may designate various parameters related to Immediate MDT. In the present embodiment, the base station eNB performing the setting designates a reporting condition (Reporting trigger) which is one of parameters of Immediate MDT. The reporting condition refers to a trigger on the basis of which the radio terminal UE reports measurement data to the E-UTRAN 10.

There is a certain coverage problem that cannot be resolved, even when normal network optimization is performed, depending on a factor causing RSRP to deteriorate. For example, a problem that RSRP rapidly deteriorates when the radio terminal UE moves into an elevator and the door is closed, may not be resolved even when normal network optimization is performed. Thus, it is preferable that the coverage problem be excluded from a target for network optimization.

Therefore, in the present embodiment, the radio terminal UE set to perform Immediate MDT excludes measurement data corresponding to RSRP showing a rapid decrease, from a target to be reported to the E-UTRAN 10, when the rapid decrease is detected in a connected mode.

(2) Configuration of Radio Terminal

Figure 2:
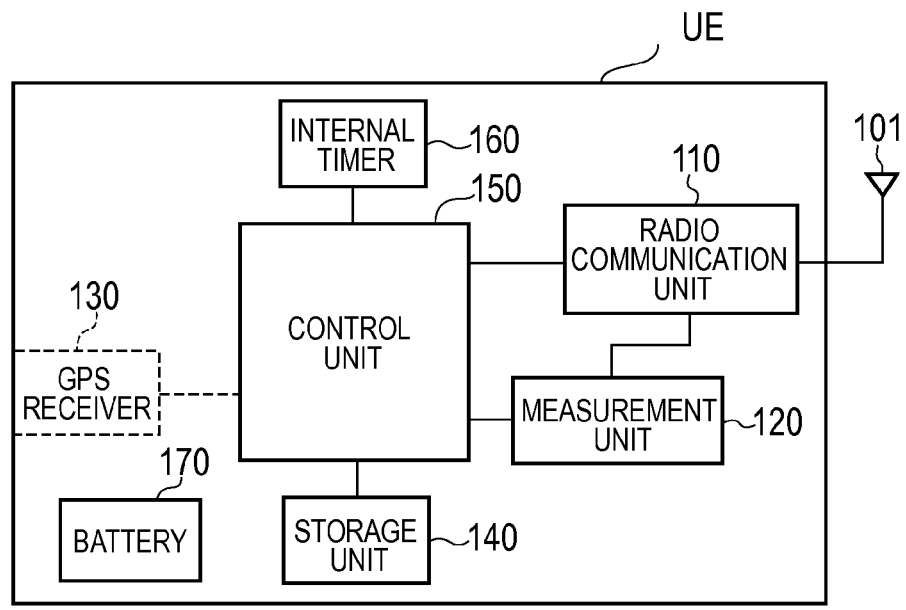
FIG. 2 is a block diagram illustrating a configuration of a radio terminal according to the first embodiment.

FIG. 2 is a block diagram illustrating a configuration of the radio terminal UE according to the present embodiment. Herein, an example where the radio terminal UE has a GPS function is described.

As illustrated in FIG. 2, the radio terminal UE includes an antenna 101, a radio communication unit 110, a measurement unit 120, a GPS receiver 130, a storage unit 140, a control unit 150, an internal timer 160, and a battery 170.

The antenna 101 is used for transmitting and receiving a radio signal. The radio communication unit 110, for example, is configured using a radio frequency (RF) circuit or a baseband (BB) circuit, and is configured to perform radio communication through the antenna 101. For transmission, the radio communication unit 110 performs coding and modulation of a transmission signal that is input from the control unit 150, performs up-converting and amplification for the modulated signal, and then outputs the amplified signal to the antenna 101. For reception, the radio communication unit 110 performs amplification and down-converting of a reception signal that is input from the antenna 101, performs demodulation and decoding for the converted signal, and then outputs the demodulated signal to the control unit 150.

The measurement unit 120 measures a received power level, that is, RSRP of a radio signal (specifically, a reference signal) received by the radio communication unit 110 from the E-UTRAN 10, and outputs the measured RSRP (hereinafter, referred to as an "RSRP measurement value") to the control unit 150. The RSRP measurement value may be an RSRP value of a serving cell alone, and may be an average or a sum of RSRP values of each cell.

The GPS receiver 130 receives a signal from a GPS satellite, and outputs location information using a GPS to the control unit 150.

For example, the storage unit 140 is configured using a memory, and stores various types of information used for controlling the radio terminal UE. The storage unit 140 stores various threshold values for detecting a rapid decrease in RSRP and the like, and setting information related to Immediate MDT. In the present embodiment, the various threshold values include an RSRP threshold value A, an RSRP threshold value B, an internal timer threshold value A, and an internal timer threshold value B. Each threshold value will be specifically described below.

For example, the control unit 150 is configured using a CPU, and controls various functions provided in the radio terminal UE.

The control unit 150 generates measurement data obtained by associating an RSRP measurement value input from the measurement unit 120 with location information input from the GPS receiver 130 in accordance with the setting information stored in the storage unit 140.

In addition, the control unit 150 controls the radio communication unit 110 such that the measurement data generated by the measurement and collection is reported to the E-UTRAN 10 in accordance with the reporting condition which is one of pieces of setting information stored in the storage unit 140.

In the present embodiment, Radio Link Failure (RLF) is used as the reporting condition. RLF as the reporting condition performs a report when satisfying a condition that a time period for which the RSRP measurement value falls below the RSRP threshold value A exceeds a certain time period corresponding to the internal timer threshold value A. The certain time period is specified by the internal timer threshold value A.

The internal timer 160 is used when the control unit 150 detects a rapid decrease in RSRP. The internal timer 160 is activated by the control unit 150 when the RSRP measurement value falls below the RSRP threshold value A. After being activated, the internal timer 160 outputs a timer value increasing over time to the control unit 150.

The battery 170 stores power to be provided to each block of the radio terminal UE.

In the radio terminal UE configured as above, the control unit 150 detects a rapid decrease in the RSRP measurement value from the measurement unit 120 by using the timer value input from the internal timer 160 and the various threshold values stored in the storage unit 140 during the execution of Immediate MDT.

In the present embodiment, the rapid decrease in the RSRP measurement value indicates that the RSRP measurement value decreases by a predetermined amount corresponding to a difference between the RSRP threshold value A and the RSRP threshold value B within a predetermined time period corresponding to the internal timer threshold value B. The predetermined time period corresponding to the internal timer threshold value B is set to a time period shorter than a certain time period corresponding to the internal timer threshold value A.

When a rapid decrease in the RSRP measurement value is detected, the control unit 150 performs control so that the measurement data corresponding to the RSRP measurement value showing the rapid decrease is excluded from a target to be reported to the E-UTRAN 10. The measurement data corresponding to the RSRP measurement value showing the rapid decrease may be measurement data at a point of time when the rapid decrease in the RSRP measurement value is detected, or may be measurement data from the point of time when the rapid decrease in the RSRP measurement value is detected before a predetermined time.

Figure 3:
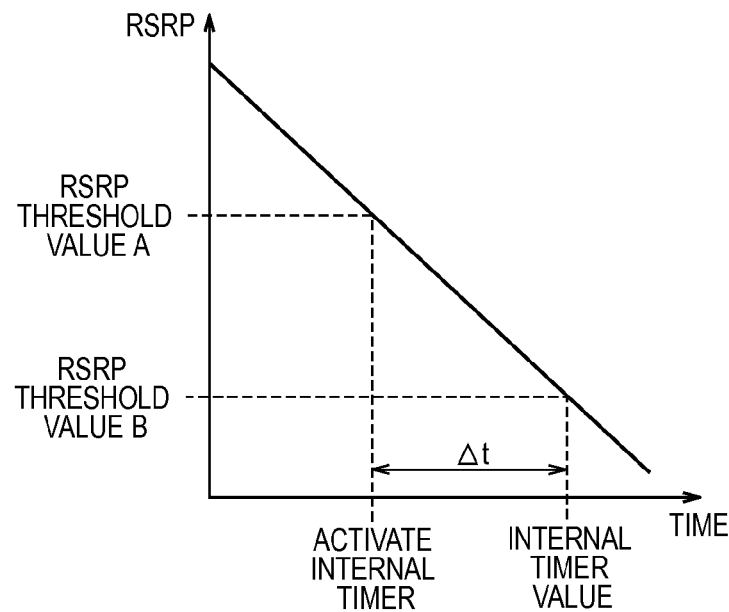
FIG. 3 is a diagram illustrating an operation of detecting a rapid decrease in RSRP.

FIG. 3 is a diagram illustrating an operation of detecting a rapid decrease in the RSRP measurement value. FIG. 3 illustrates a state in which RSRP monotonously decreases over time to describe a concept of detection.

As illustrated in FIG. 3, the control unit 150 detects a rapid decrease in RSRP by using $\Delta t$ which is a time difference from a time when the RSRP measurement value falls below the RSRP threshold value A to a time when the RSRP measurement value falls below the RSRP threshold value B.

The control unit 150 measures $\Delta t$ by activating the internal timer 160 when RSRP measurement value falls below the RSRP threshold value A, and identifying a timer value of the internal timer 160 when the RSRP measurement value falls below the RSRP threshold value B. When $\Delta t$ is less than or equal to the RSRP threshold value B, it is possible to determine that RSRP rapidly decreases.

(3) Operation of Radio Terminal

Figure 4:
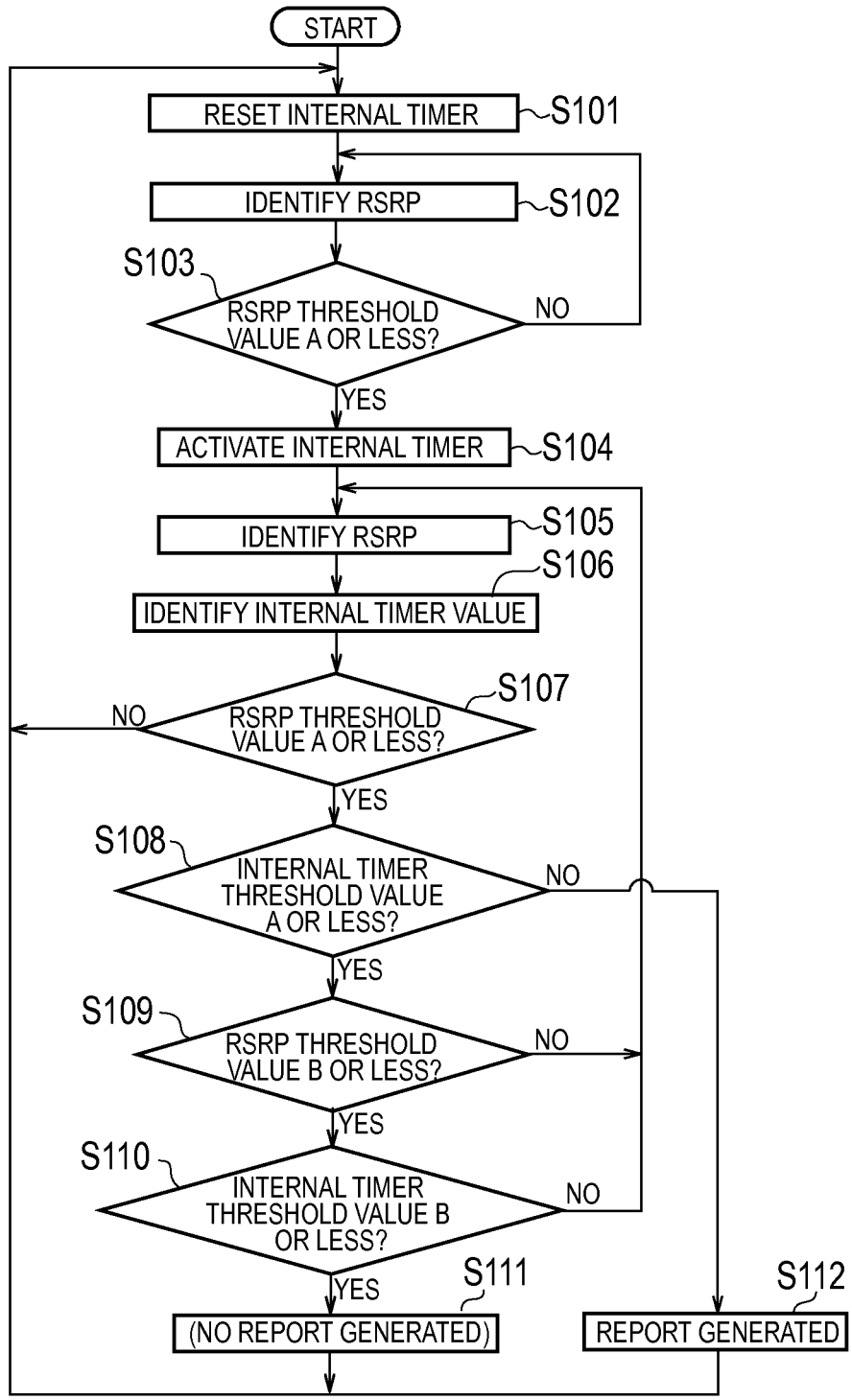
FIG. 4 is a flowchart illustrating an operation of a radio terminal according to the first embodiment.

FIG. 4 is a flowchart illustrating an operation of the radio terminal UE according to the present embodiment. The flow is started when the radio terminal UE is set to perform Immediate MDT from the E-UTRAN 10. First, in response to the flow started, the control unit 150 controls the measurement unit 120 so that RSRP is continuously measured.

As illustrated in FIG. 4, the control unit 150 resets the internal timer 160 in step S101.

In step S102, the control unit 150 identifies an RSRP measurement value input from the measurement unit 120.

In step S103, the control unit 150 compares the RSRP measurement value identified in step S102 with the RSRP threshold value A. When the RSRP measurement value identified in step S102 exceeds the RSRP threshold value A, the control unit 150 causes the process to return to step S102. On the other hand, when the RSRP measurement value identified in step S102 is less than or equal to the RSRP threshold value A, the control unit 150 causes the process to proceed to step S104. The measurement and collection are performed after step S104.

In step S104, the control unit 150 activates the internal timer 160.

In step S105, the control unit 150 identifies the RSRP measurement value input from the measurement unit 120.

In step S106, the control unit 150 identifies a timer value input from the internal timer 160.

In step S107, the control unit 150 compares the RSRP measurement value identified in step S105 with the RSRP threshold value A. When the RSRP measurement value identified in step S105 exceeds the RSRP threshold value A, the control unit 150 causes the process to return to step S101. On the other hand, when the RSRP measurement value identified in step S105 is less than or equal to the RSRP threshold value A, the control unit 150 causes the process to proceed to step S108.

In step S108, the control unit 150 compares the timer value identified in step S106 with the internal timer threshold value A. When the timer value identified in step S106 exceeds the internal timer threshold value A, the control unit 150 causes the process to proceed to step S112. On the other hand, when the timer value identified in step S106 is less than or equal to the internal timer threshold value A, the control unit 150 causes the process to proceed to step S109.

In step S112, since the internal timer 160 times out and the reporting condition is satisfied without the RSRP measurement value rapidly decreasing, the control unit 150 performs a control so that the measurement data is reported to the E-UTRAN 10. Specifically, the control unit 150 outputs the measurement data to the radio communication unit 110, and the radio communication unit 110 transmits the measurement data input from the control unit 150 to the base station eNB which is a connection destination.

On the other hand, in step S109, the control unit 150 compares the RSRP measurement value identified in step S105 with the RSRP threshold value B. When the RSRP measurement value identified in step S105 exceeds the RSRP threshold value B, the control unit 150 causes the process to return to step S105. On the other hand, when the RSRP measurement value identified in step S105 is less than or equal to the RSRP threshold value B, the control unit 150 causes the process to proceed to step S110.

In step S110, the control unit 150 compares the timer value identified in step S106 with the internal timer threshold value B. When the timer value identified in step S106 exceeds the internal timer threshold value B, the control unit 150 causes the process to return to step S105. On the other hand, when the timer value identified in step S106 is less than or equal to the internal timer threshold value B, the RSRP measurement value rapidly decreases and thus, the control unit 150 causes the process to proceed to step S111.

In step S111, the control unit 150 suspends the report of the measurement data by RLF, and causes the process to return to step S101.

(4) Effect of Embodiments

As described in the foregoing, according to the present embodiment, the radio terminal UE set to perform Immediate MDT excludes the measurement data corresponding to the RSRP measurement value showing a rapid decrease, from a target to be reported to the E-UTRAN 10, when the rapid decrease in the RSRP measurement value is detected in the connected mode.

This makes it possible, for example, to eliminate a need of reporting, to the E-UTRAN 10, the measurement data related to a coverage problem that RSRP rapidly decreases when the radio terminal UE moves into an elevator and the door is closed, and therefore, it is possible to exclude the coverage problem from a target for network optimization.

Accordingly, the radio terminal UE according to the present embodiment can avoid induction of inappropriate network optimization and an increase in load and amount of resource consumption.

In the present embodiment, the predetermined time period corresponding to the internal timer threshold value B is set to a time period shorter than a certain time period corresponding to the internal timer threshold value A. Thus, since a rapid decrease in the RSRP measurement value can be detected before RLF is detected, it is possible to appropriately suspend a report by RLF.

(5) Modifications

In the first embodiment described above, Δt which is a time difference from a time when the RSRP measurement value falls below the RSRP threshold value A to a time when the RSRP measurement value falls below the RSRP threshold value B is acquired using the internal timer 160, and it is determined whether the RSRP measurement value rapidly decreases based on whether Δt is less than or equal to the internal timer threshold value B. However, the invention is not limited to such a criterion for determination, and a slope of change calculated from the amount of change of RSRP in a certain time period may be used as a criterion for determination. For example, it is possible to acquire the amount of decrease in the RSRP measurement value within a certain time period, compare the amount of decrease with a threshold value, and determine that the RSRP measurement value rapidly decreases when the amount of decrease exceeds the threshold value.

In the first embodiment described above, an operation for enabling the report to be resumed after the report of the measurement data is suspended is not particularly described. However, the report may be in a restartable state after the report of the measurement data is suspended. In this case, the control unit 150 of the radio terminal UE may perform a control so that a state in which a report of the measurement data is suspended is continued after detecting a rapid decrease in the RSRP measurement value until the RSRP measurement value exceeds the RSRP threshold value A.

In the first embodiment described above, RLF is used as the reporting condition. However, in addition to RLF, another reporting condition such as Periodic and Serving cell becomes worse than threshold (SCBWTT) may be used. Periodic is a reporting condition on which a report is periodically performed, and SCBWTT is a reporting condition on which a report is performed when RSRP measured for a serving cell falls below a threshold value.

In the first embodiment described above, an example of a mobile communication system configured based on LTE, standards of which have been designed in 3GPP, is described. However, in addition to LTE, the present invention may be applied to another mobile communication system such as W-CDMA (Wideband Code Division Multiple Access).

In the first embodiment described above, Immediate MDT is mainly described. However, the present invention may be applied to Logged MDT.

Second Embodiment

With regard a second embodiment of the present invention, (1) Overview of mobile communication system, (2) Configuration of radio terminal, (3) Operation of radio terminal, (4) Effect of embodiments, and (5) Modifications will be sequentially described with reference to drawings.

(1) Overview of Mobile Communication System

FIG. 1 is an entire schematic configuration diagram of a mobile communication system 1 according to the present embodiment. The mobile communication system 1 is configured on the basis of LTE (Long Term Evolution), standards of which have been designed in 3GPP, and supports the above described Logged MDT.

As illustrated in FIG. 1, the mobile communication system 1 includes a radio terminal UE, E-UTRAN (Evolved-UMTS Terrestrial Radio Access Network) 10, a mobile management device MME/gateway device S-GW, and a maintenance monitoring device OAM. The E-UTRAN 10 is a mobile communication network configured by a plurality of base stations eNB.

The radio terminal UE is a transportable radio communication device belonging to a user. The radio terminal UE is configured to connect to one of the base stations eNB constituting the E-UTRAN 10 (including a case of connecting thereto via a relay device, or connecting to a relay device), and enable communication with a communication destination via the base station eNB. A state in which the radio terminal UE is performing communication is referred to as a connected mode, and a state in which the radio terminal UE is standing by is referred to as an idle mode.

Each base station eNB is a fixed radio communication device set up by an operator, and is configured to perform radio communication with the radio terminal UE. Each base station eNB performs communication with the mobile management device MME/gateway device S-GW, and communication with the maintenance monitoring device OAM via a backhaul.

The mobile management device MME is configured to perform various mobility controls for the radio terminal UE, and the gateway device S-GW is configured to perform transfer control of user data transmitted and received by the radio terminal UE.

The maintenance monitoring device OAM is a server device set up by an operator, and is configured to perform maintenance and monitoring of the E-UTRAN 10.

In the present embodiment, for example, the base station eNB which is a connection destination of the radio terminal UE transmits information for setting Logged MDT in the radio terminal UE to the radio terminal UE in response to an instruction from the maintenance monitoring device OAM.

The radio terminal UE set to perform Logged MDT measures and records a received-signal state from the E-UTRAN 10 in the idle mode, and reports measurement data to the E-UTRAN 10 during a transition from the idle mode to the connected mode. Hereinafter, processing of appropriately generating measurement data by the radio terminal UE is referred to as "measurement and collection".

In addition, reference signal received power (RSRP) as an index of a received-signal state is used in the present embodiment. However, reference signal received quality (RSRQ) may be used together with RSRP.

Measurement data includes information related to a measurement result and location information at the time of measurement. For example, the information related to a measurement result is information indicating RSRP for each cell of one or a plurality of base stations eNB. The location information is GPS/GNSS location information when the radio terminal UE has a GPS/GNSS function, and is RF fingerprint information when the radio terminal UE does not have a GPS receiving function.

The base station eNB receiving measurement data from the radio terminal UE transfers the received measurement data to the maintenance monitoring device OAM. If the maintenance monitoring device OAM discovers a coverage problem on the basis of the measurement data acquired in this way, the maintenance monitoring device OAM performs network optimization for notifying an operator of the discovered coverage problem or solving the discovered coverage problem.

When Logged MDT is set in the radio terminal UE, the base station eNB performing the setting may designate various parameters related to Logged MDT. In the present embodiment, the base station eNB performing the setting designates a recording condition (Logging trigger) which is one of parameters of Logged MDT. The recording condition refers to a trigger on the basis of which the radio terminal UE records the measurement data.

There is a certain coverage problem that cannot be resolved, even when normal network optimization is performed, depending on a factor causing RSRP to deteriorate. For example, a problem that RSRP rapidly deteriorates when the radio terminal UE moves into an elevator and the door is closed, may not be resolved even when normal network optimization is performed. Thus, it is preferable that the coverage problem be excluded from a target for network optimization.

Therefore, in the present embodiment, the radio terminal UE set to perform Logged MDT excludes measurement data corresponding to RSRP showing a rapid decrease, from a target to be recorded, when the rapid decrease is detected in the idle mode.

(2) Configuration of Radio Terminal

Figure 5:
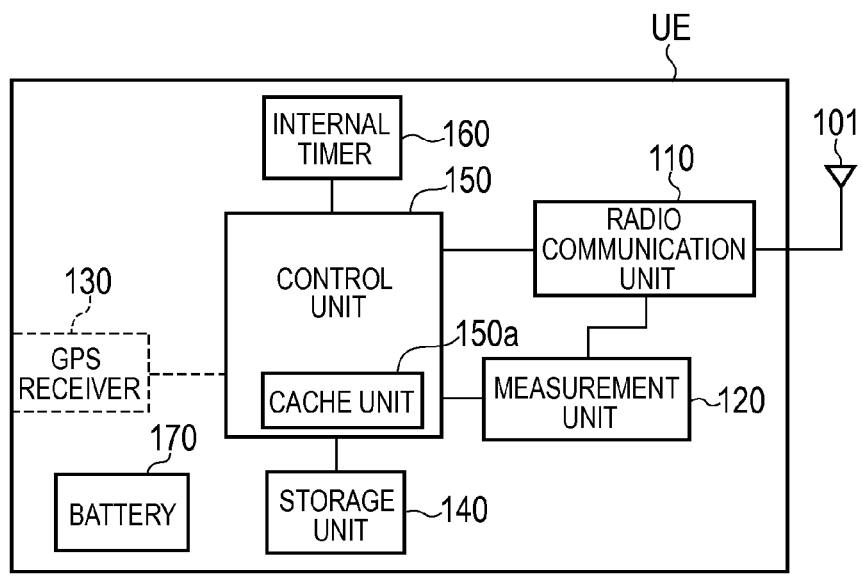
FIG. 5 is a block diagram illustrating a configuration of a radio terminal according to the second embodiment.

FIG. 5 is a block diagram illustrating a configuration of the radio terminal UE according to the present embodiment. Herein, an example where the radio terminal UE has a GPS function is described.

As illustrated in FIG. 5, the radio terminal UE includes the antenna 101, the radio communication unit 110, the measurement unit 120, the GPS receiver 130, the storage unit 140, the control unit 150, the internal timer 160, and the battery 170.

The antenna 101 is used for transmitting and receiving a radio signal. The radio communication unit 110, for example, is configured using a radio frequency (RF) circuit or a baseband (BB) circuit, and is configured to perform radio communication through the antenna 101. For transmission, the radio communication unit 110 performs coding and modulation of a transmission signal that is input from the control unit 150, performs up-converting and amplification for the modulated signal, and then outputs the amplified signal to the antenna 101. For reception, the radio communication unit 110 performs amplification and down-converting of a reception signal that is input from the antenna 101, performs demodulation and decoding for the converted signal, and then outputs the demodulated signal to the control unit 150.

The measurement unit 120 measures a received power level, that is, RSRP of a radio signal (specifically, a reference signal) received by the radio communication unit 110 from the E-UTRAN 10, and outputs the measured RSRP (hereinafter, referred to as an "RSRP measurement value") to the control unit 150.

The GPS receiver 130 receives a signal from a GPS satellite, and outputs location information using a GPS to the control unit 150.

For example, the storage unit 140 is configured using a memory, and stores various types of information used for controlling the radio terminal UE. The storage unit 140 stores various threshold values for detecting a rapid decrease in RSRP and the like, and setting information related to Logged MDT. In the present embodiment, the various threshold values include an RSRP threshold value A, an RSRP threshold value B, an internal timer threshold value A, and an internal timer threshold value B. Each threshold value will be specifically described below.

For example, the control unit 150 is configured using a CPU, and controls various functions provided in the radio terminal UE.

The control unit 150 generates measurement data obtained by associating the RSRP measurement value input from the measurement unit 120 with location information input from the GPS receiver 130, and temporarily holds (caches) the generated measurement data in a cache unit 150a in accordance with the setting information stored in the storage unit 140.

In addition, the control unit 150 performs a control so that the measurement data temporarily held in the cache unit 150a is recorded in the storage unit 140 in accordance with the recording condition which is one of pieces of setting information stored in the storage unit 140.

Then, the control unit 150 controls the radio communication unit 110 so that the measurement data recorded in the storage unit 140 is reported to the E-UTRAN 10 during a transition from the idle mode to the connected mode.

In the present embodiment, Serving cell becomes worse than threshold (SCBWTT) is used as the recording condition. SCBWTT as the recoding condition performs a record in response to a completion of the measurement and collection over a certain time period after the RSRP measurement value for a serving cell falls below the RSRP threshold value A. The certain time period is specified by the internal timer threshold value A.

The internal timer 160 is used when the control unit 150 detects a rapid decrease in RSRP. The internal timer 160 is activated by the control unit 150 when the RSRP measurement value falls below the RSRP threshold value A. After being activated, the internal timer 160 outputs a timer value increasing over time to the control unit 150.

The battery 170 stores power to be provided to each block of the radio terminal UE.

In the radio terminal UE configured as above, the control unit 150 detects a rapid decrease in the RSRP measurement value from the measurement unit 120 by using the timer value input from the internal timer 160 and the various threshold values stored in the storage unit 140 during the execution of Logged MDT.

In the present embodiment, the rapid decrease in the RSRP measurement value indicates that the RSRP measurement value decreases by a predetermined amount corresponding to a difference between the RSRP threshold value A and the RSRP threshold value B within a predetermined time period corresponding to the internal timer threshold value B. Herein, the predetermined time period corresponding to the internal timer threshold value B is set to a time period shorter than a certain time period corresponding to the internal timer threshold value A.

When a rapid decrease in the RSRP measurement value is detected, the control unit 150 performs control so that the measurement data corresponding to the RSRP measurement value showing the rapid decrease is excluded from a target to be reported to the E-UTRAN 10.

The measurement data corresponding to the RSRP measurement value showing the rapid decrease refers to, for example, measurement data for a time period from when the measurement and collection is started as a result of the RSSP measurement value falling below the RSRP threshold value A until the rapid decrease in the RSRP measurement value is detected.

In the present embodiment, when a rapid decrease in the RSRP measurement value is detected, the control unit 150 discards the measurement data corresponding to the RSRP measurement value showing the rapid decrease without moving the measurement data from the cache unit 150a to the storage unit 140.

Figure 6:
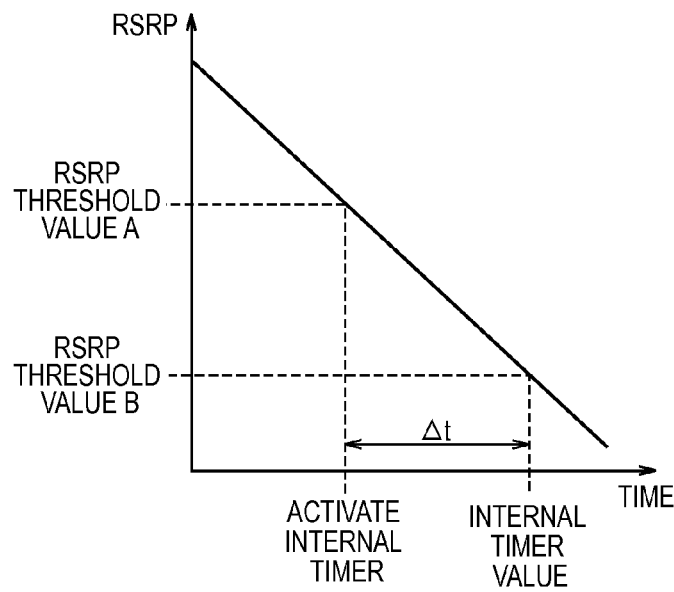
FIG. 6 is a diagram illustrating an operation of detecting a rapid decrease in RSRP.

FIG. 6 is a diagram illustrating an operation of detecting the rapid decrease in the RSRP measurement value. FIG. 3 illustrates a state in which RSRP monotonously decreases over time to describe a concept of detection.

As illustrated in FIG. 6, the control unit 150 detects a rapid decrease in RSRP by using $\Delta t$ which is a time difference from a time when the RSRP measurement value falls below the RSRP threshold value A to a time when the RSRP measurement value falls below the RSRP threshold value B.

The control unit 150 measures $\Delta t$ by activating the internal timer 160 when RSRP measurement value falls below the RSRP threshold value A, and identifying a timer value of the internal timer 160 when the RSRP measurement value falls below the RSRP threshold value B. When $\Delta t$ is less than or equal to the RSRP threshold value B, it is possible to determine that RSRP rapidly decreases.

(3) Operation of Radio Terminal

Figure 7:
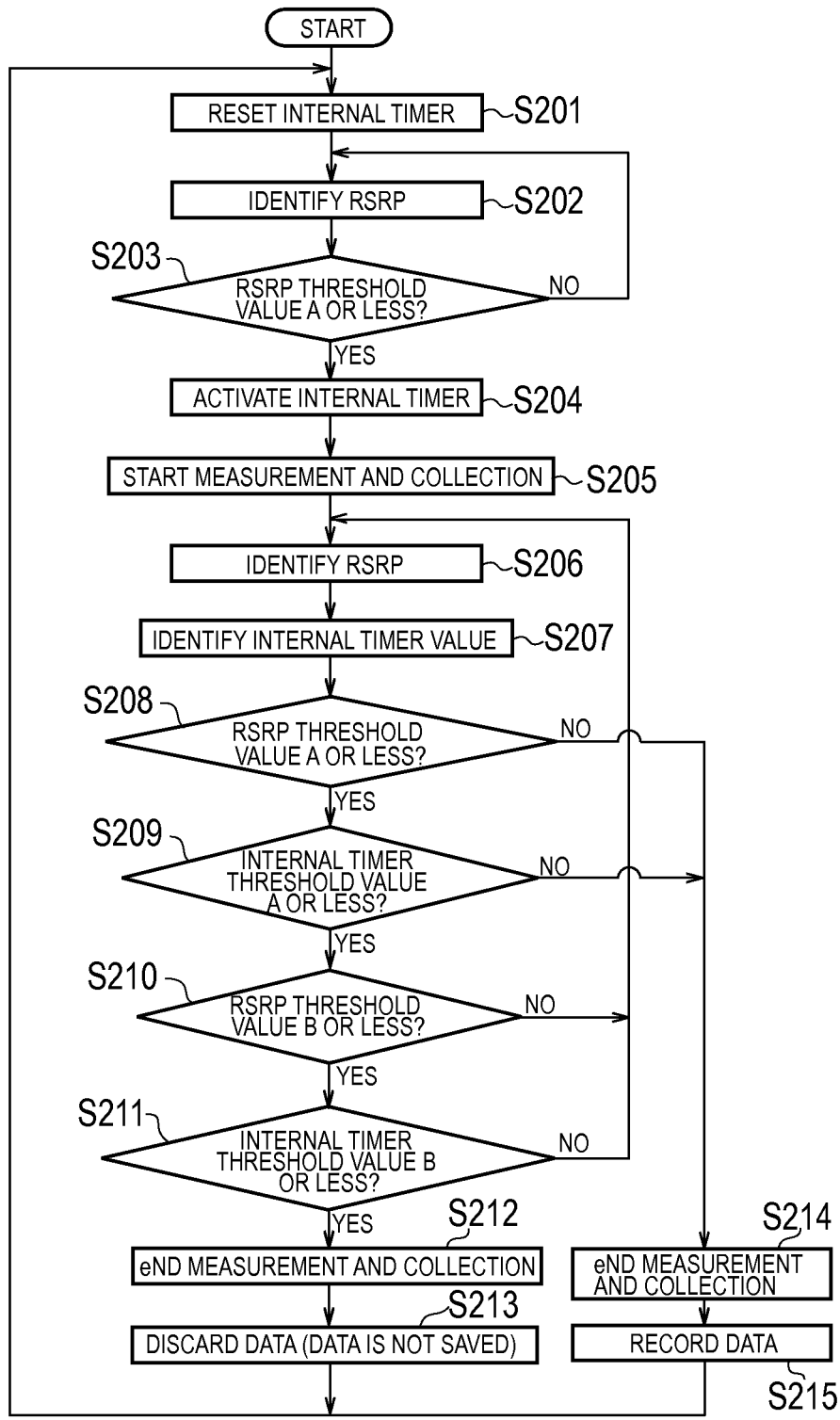
FIG. 7 is a flowchart illustrating an operation of a radio terminal according to the second embodiment.

FIG. 7 is a flowchart illustrating an operation of the radio terminal UE according to the present embodiment. The flow is started in response to a transition to the idle mode after the radio terminal UE is set to perform Logged MDT from the E-UTRAN 10. First, in response to the flow started, the control unit 150 controls the measurement unit 120 so that RSRP is continuously measured.

As illustrated in FIG. 7, the control unit 150 resets the internal timer 160 in step S201.

In step S202, the control unit 150 identifies the RSRP measurement value input from the measurement unit 120.

In step S203, the control unit 150 compares the RSRP measurement value identified in step S202 with the RSRP threshold value A. When the RSRP measurement value identified in step S202 exceeds the RSRP threshold value A, the control unit 150 causes the process to return to step S202. On the other hand, when the RSRP measurement value identified in step S202 is less than or equal to the RSRP threshold value A, the control unit 150 causes the process to proceed to step S204.

In step S204, the control unit 150 activates the internal timer 160. Then, the control unit 150 starts the measurement and collection in step S205.

In step S206, the control unit 150 identifies the RSRP measurement value input from the measurement unit 120.

In step S207, the control unit 150 identifies the timer value input from the internal timer 160.

In step S208, the control unit 150 compares the RSRP measurement value identified in step S206 with the RSRP threshold value A. When the RSRP measurement value identified in step S206 exceeds the RSRP threshold value A, the control unit 150 causes the process to return to step S201. On the other hand, when the RSRP measurement value identified in step S206 is less than or equal to the RSRP threshold value A, the control unit 150 causes the process to proceed to step S209.

In step S209, the control unit 150 compares the timer value identified in step S207 with the internal timer threshold value A. When the timer value identified in step S207 exceeds the internal timer threshold value A, the control unit 150 causes the process to proceed to step S214. On the other hand, when the timer value identified in step S207 is less than or equal to the internal timer threshold value A, the control unit 150 causes the process to proceed to step S210.

In step 214, since the internal timer 160 times out and the recording condition is satisfied without the RSRP measurement value rapidly decreasing, the control unit 150 ends the measurement and collection. Then, the control unit 150 performs a control so that the measurement data temporarily held in the cache unit 150a is recorded in the storage unit 140 in step S215.

Meanwhile, the control unit 150 compares the RSRP measurement value identified in step S206 with the RSRP threshold value B in step S210. When the RSRP measurement value identified in step S206 exceeds the RSRP threshold value B, the control unit 150 causes the process to return to step S206. On the other hand, when the RSRP measurement value identified in step S206 is less than or equal to the RSRP threshold value B, the control unit 150 causes the process to proceed to step S211.

In step S211, the control unit 150 compares the timer value identified in step S207 with the internal timer threshold value B. When the timer value identified in step S207 exceeds the internal timer threshold value B, the control unit 150 causes the process to return to step S206. On the other hand, when the timer value identified in step S207 is less than or equal to the internal timer threshold value B, the RSRP measurement value rapidly decreases and thus, the control unit 150 causes the process to proceed to step S212.

In step S212, the control unit 150 ends the measurement and collection. Then, the control unit 150 discards the measurement data temporarily held in the cache unit 150a without recording the measurement data in the storage unit 140 in step S213.

(4) Effect of Embodiments

As described in the foregoing, according to the present embodiment, the radio terminal UE set to perform Logged MDT excludes the measurement data corresponding to the RSRP measurement value showing a rapid decrease, from a target to be recorded, when the rapid decrease in the RSRP measurement value is detected in the idle mode.

As a result, it is possible, for example, to eliminate a need of reporting, to the E-UTRAN 10, during a transition to the connected mode, the measurement data related to a coverage problem that RSRP rapidly decreases when the radio terminal UE moves into an elevator and the door is closed, and therefore, it is possible to exclude the coverage problem from a target for network optimization.

Accordingly, the radio terminal UE according to the present embodiment can avoid induction of inappropriate network optimization and an increase in load and amount of resource consumption.

In the present embodiment, the predetermined time period corresponding to the internal timer threshold value B is set to a time period shorter than a certain time period corresponding to the internal timer threshold value A. Thus, since a rapid decrease in the RSRP measurement value can be detected before the recording period is ended, it is possible to appropriately suspend the measurement and collection.

(5) Modifications

In the second embodiment described above, the measurement and collection is started after the RSRP measurement value falls below the RSRP threshold value A. However, when measurement data prior to the RSRP measurement value falling below the RSRP threshold value A is needed to be reported to the E-UTRAN 10, the most recent measurement data may be collected within the range of a capacity of the cache unit 150a after step S201 and before step S204.

In the second embodiment described above, measurement data within the cache unit 150a is discarded without being recorded in the storage unit 140 when the received-signal state is improved before the timeout. However, when the RSRP measurement value exceeds the RSRP threshold value A before the internal timer value exceeds the internal timer threshold value A, the measurement and collection may be continued until the timeout rather than immediately ending the measurement and collection.

In the second embodiment described above, Δt which is a time difference from a time when the RSRP measurement value falls below the RSRP threshold value A to a time when the RSRP measurement value falls below the RSRP threshold value B is acquired using the internal timer 160, and it is determined whether the RSRP measurement value rapidly decreases based on whether Δt is less than or equal to the internal timer threshold value B. However, the invention is not limited to such a criterion for determination, and a slope of change calculated from the amount of change of RSRP in a certain time period may be used as a criterion for determination. For example, it is possible to acquire the amount of decrease in the RSRP measurement value within a certain time period, compare the amount of decrease with a threshold value, and determine that the RSRP measurement value rapidly decreases when the amount of decrease exceeds the threshold value.

In the second embodiment described above, an operation for enabling the record to be resumed after the record of the measurement data is suspended is not particularly described. However, the record may be in a restartable state after the record of the measurement data is suspended. In this case, the control unit 150 of the radio terminal UE may perform a control so that a state in which the record of the measurement data is suspended is continued after detecting a rapid decrease in the RSRP measurement value until the RSRP measurement value exceeds the RSRP threshold value A.

In the second embodiment described above, SCBWTT is used as the recording condition. However, in addition to SCB-WTT, another recording condition such as Periodic and Transmit power headroom becomes less than threshold may be used. Periodic is a recording condition on which a record is periodically performed, and Transmit power headroom becomes less than threshold is a recording condition on which a record is performed when a transmission power margin falls below a threshold value.

In the second embodiment described above, an example of a mobile communication system configured based on LTE, standards of which have been designed in 3GPP, is described. However, in addition to LTE, the present invention may be applied to another mobile communication system such as W-CDMA (Wideband Code Division Multiple Access).

Third Embodiment

With regard a third embodiment of the present invention, (1) Overview of mobile communication system, (2) Configuration of radio terminal, (3) Operation of radio terminal, (4) Effect of embodiments, and (5) Modifications will be sequentially described with reference to drawings.

(1) Overview of Mobile Communication System

FIG. 1 is an entire schematic configuration diagram of a mobile communication system 1 according to the present embodiment. The mobile communication system 1 is configured on the basis of LTE (Long Term Evolution), standards of which have been designed in 3GPP, and supports the above described Logged MDT.

As illustrated in FIG. 1, the mobile communication system 1 includes a radio terminal UE, E-UTRAN (Evolved-UMTS Terrestrial Radio Access Network) 10, a mobile management device MME/gateway device S-GW, and a maintenance monitoring device OAM. The E-UTRAN 10 is a mobile communication network configured by a plurality of base stations eNB.

The radio terminal UE is a transportable radio communication device belonging to a user. The radio terminal UE is configured to connect to one of the base stations eNB constituting the E-UTRAN 10 (including a case of connecting thereto via a relay device, or connecting to a relay device), and enable communication with a communication destination via the base station eNB. A state in which the radio terminal UE is performing communication is referred to as a connected mode, and a state in which the radio terminal UE is standing by is referred to as an idle mode.

Each base station eNB is a fixed radio communication device set up by an operator, and is configured to perform radio communication with the radio terminal UE. Each base station eNB performs communication with the mobile management device MME/gateway device S-GW, and communication with the maintenance monitoring device OAM via a backhaul.

The mobile management device MME is configured to perform various mobility controls for the radio terminal UE, and the gateway device S-GW is configured to perform transfer control of user data transmitted and received by the radio terminal UE.

The maintenance monitoring device OAM is a server device set up by an operator, and is configured to perform maintenance and monitoring of the E-UTRAN 10.

In the present embodiment, for example, the base station eNB which is a connection destination of the radio terminal UE transmits information for setting Logged MDT in the radio terminal UE to the radio terminal UE in response to an instruction from the maintenance monitoring device OAM.

The radio terminal UE set to perform Logged MDT measures and records a received-signal state from the E-UTRAN 10 in the idle mode, and reports measurement data to the E-UTRAN 10 during a transition from the idle mode to the connected mode. Hereinafter, processing of appropriately generating measurement data by the radio terminal UE is referred to as "measurement and collection".

In addition, reference signal received power (RSRP) as an index of a received-signal state is used in the present embodiment. However, reference signal received quality (RSRQ) may be used together with RSRP.

Measurement data includes information related to a measurement result and location information at the time of measurement. For example, the information related to a measurement result is information indicating RSRP for each cell of one or a plurality of base stations eNB. The location information is GPS/GNSS location information when the radio terminal UE has a GPS/GNSS function, and is RF fingerprint information when the radio terminal UE does not have a GPS receiving function.

The base station eNB receiving measurement data from the radio terminal UE transfers the received measurement data to the maintenance monitoring device OAM. If the maintenance monitoring device OAM discovers a coverage problem on the basis of the measurement data acquired in this way, the maintenance monitoring device OAM performs network optimization for notifying an operator of the discovered coverage problem or solving the discovered coverage problem.

When Logged MDT is set in the radio terminal UE, the base station eNB performing the setting may designate various parameters related to Logged MDT. In the present embodiment, the base station eNB performing the setting designates a recording condition (Logging trigger) which is one of parameters of Logged MDT. The recording condition refers to a trigger on the basis of which the radio terminal UE records the measurement data.

There is a certain coverage problem that cannot be resolved, even when normal network optimization is performed, depending on a factor causing RSRP to deteriorate. For example, a problem that RSRP rapidly deteriorates when the radio terminal UE moves into an elevator and the door is closed, may not be resolved even when normal network optimization is performed. Thus, it is preferable that the coverage problem be excluded from a target for network optimization.

Therefore, in the present embodiment, the radio terminal UE set to perform Logged MDT deletes all recorded measurement data when a rapid decrease in RSRP is detected in the idle mode.

(2) Configuration of Radio Terminal

Figure 8:
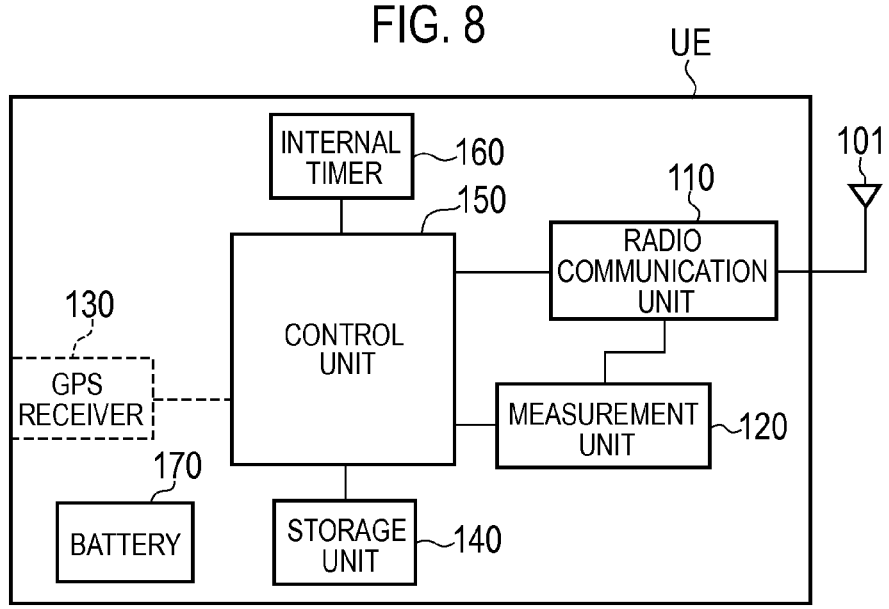
FIG. 8 is a block diagram illustrating a configuration of a radio terminal according to the third embodiment.

FIG. 8 is a block diagram illustrating a configuration of the radio terminal UE according to the present embodiment. Herein, an example where the radio terminal UE has a GPS function is described.

As illustrated in FIG. 8, the radio terminal UE includes the antenna 101, the radio communication unit 110, the measurement unit 120, the GPS receiver 130, the storage unit 140, the control unit 150, the internal timer 160, and the battery 170.

The antenna 101 is used for transmitting and receiving a radio signal. The radio communication unit 110, for example, is configured using a radio frequency (RF) circuit or a baseband (BB) circuit, and is configured to perform radio communication through the antenna 101. For transmission, the radio communication unit 110 performs coding and modulation of a transmission signal that is input from the control unit 150, performs up-converting and amplification for the modulated signal, and then outputs the amplified signal to the antenna 101. For reception, the radio communication unit 110 performs amplification and down-converting of a reception signal that is input from the antenna 101, performs demodulation and decoding for the converted signal, and then outputs the demodulated signal to the control unit 150.

The measurement unit 120 measures a received power level, that is, RSRP of a radio signal (specifically, a reference signal) received by the radio communication unit 110 from the E-UTRAN 10, and outputs the measured RSRP (hereinafter, referred to as an "RSRP measurement value") to the control unit 150.

The GPS receiver 130 receives a signal from a GPS satellite, and outputs location information using a GPS to the control unit 150.

For example, the storage unit 140 is configured using a memory, and stores various types of information used for controlling the radio terminal UE. The storage unit 140 stores various threshold values for detecting a rapid decrease in RSRP and the like, and setting information related to Logged MDT. In the present embodiment, the various threshold values include an RSRP threshold value A, an RSRP threshold value B, an internal timer threshold value A, and an internal timer threshold value B. Each threshold value will be specifically described below.

For example, the control unit 150 is configured using a CPU, and controls various functions provided in the radio terminal UE. The control unit 150 performs a control so that measurement data obtained by associating the RSRP measurement value input from the measurement unit 120 with location information input from the GPS receiver 130 is generated, and the generated measurement data is recorded in the storage unit 140 in accordance with the setting information stored in the storage unit 140. Then, the control unit 150 performs a control so that the measurement data recorded in the storage unit 140 is reported to the E-UTRAN 10 from the radio communication unit 110 during a transition from the idle mode to the connected mode.

In the present embodiment, Serving cell becomes worse than threshold (SCBWTT) is used as the recording condition contained in the setting information. SCBWTT as the recording condition performs a record over a certain time period after the RSRP measurement value for a serving cell falls below the RSRP threshold value A. The certain time period is specified by the internal timer threshold value A.

The internal timer 160 is used when the control unit 150 detects a rapid decrease in RSRP. The internal timer 160 is activated by the control unit 150 when the RSRP measurement value falls below the RSRP threshold value A. After being activated, the internal timer 160 outputs a timer value increasing over time to the control unit 150.

The battery 170 stores power to be provided to each block of the radio terminal UE.

In the radio terminal UE configured as above, the control unit 150 detects a rapid decrease in the RSRP measurement value from the measurement unit 120 by using the timer value input from the internal timer 160 and the various threshold values stored in the storage unit 140 during the execution of Logged MDT. In the present embodiment, the rapid decrease in the RSRP measurement value indicates that the RSRP measurement value decreases by a predetermined amount corresponding to a difference between the RSRP threshold value A and the RSRP threshold value B within a predetermined time period corresponding to the internal timer threshold value B. Herein, the predetermined time period corresponding to the internal timer threshold value B is set to a time period shorter than a certain time period corresponding to the internal timer threshold value A.

Furthermore, the control unit 150 performs a control so that all measurement data recorded in the storage unit 140 is deleted when a rapid decrease in the RSRP measurement value is detected.

Figure 9:
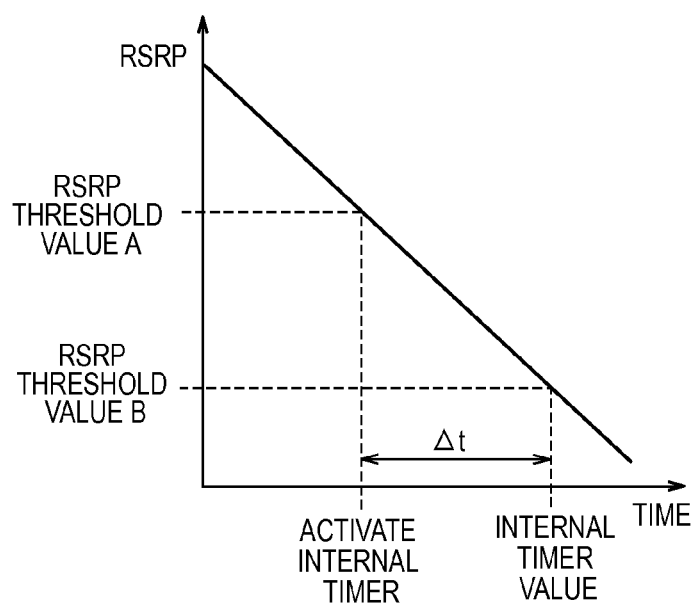
FIG. 9 is a diagram illustrating an operation of detecting a rapid decrease in RSRP.

FIG. 9 is a diagram illustrating an operation of detecting a rapid decrease in the RSRP measurement value. FIG. 3 illustrates a state in which RSRP monotonously decreases over time to describe a concept of detection.

As illustrated in FIG. 9, the control unit 150 detects a rapid decrease in RSRP by using $\Delta t$ which is a time difference from a time when the RSRP measurement value falls below the RSRP threshold value A to a time when the RSRP measurement value falls below the RSRP threshold value B.

The control unit 150 measures $\Delta t$ by activating the internal timer 160 when RSRP measurement value falls below the RSRP threshold value A, and identifying a timer value of the internal timer 160 when the RSRP measurement value falls below the RSRP threshold value B. When $\Delta t$ is less than or equal to the RSRP threshold value B, it is possible to determine that RSRP rapidly decreases.

(3) Operation of Radio Terminal

Figure 10:
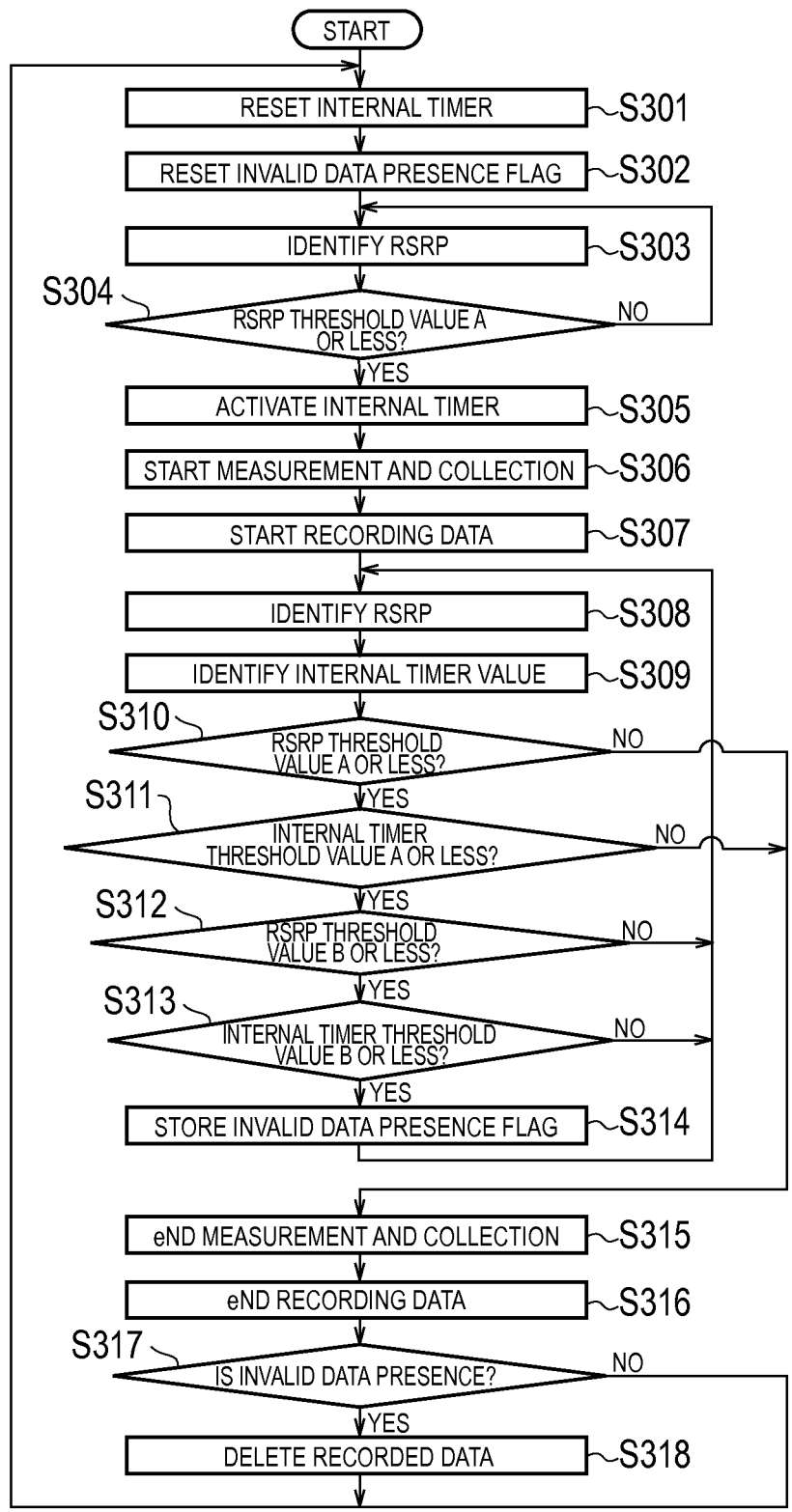
FIG. 10 is a flowchart illustrating an operation of a radio terminal according to the third embodiment.

FIG. 10 is a flowchart illustrating an operation of the radio terminal UE according to the present embodiment. The flow is started in response to a transition to the idle mode after the radio terminal UE is set to perform Logged MDT from the E-UTRAN 10. First, in response to the flow started, the control unit 150 controls the measurement unit 120 so that RSRP is continuously measured.

As illustrated in FIG. 10, the control unit 150 resets the internal timer 160 in step S301.

In step S302, the control unit 150 resets an invalid data presence flag. The invalid data presence flag is a flag for designating invalid measurement data.

In step S303, the control unit 150 identifies RSRP measurement value input from the measurement unit 120.

In step S304, the control unit 150 compares the RSRP measurement value identified in step S303 with the RSRP threshold value A. When the RSRP measurement value identified in step S303 exceeds the RSRP threshold value A, the control unit 150 causes the process to return to step S303. On the other hand, when the RSRP measurement value identified in step S303 is less than or equal to the RSRP threshold value A, the control unit 150 causes the process to proceed to step S305.

In step S305, the control unit 150 activates the internal timer 160. In addition, the control unit 150 starts the measurement and collection in step S306. Further, the control unit 150 starts recording the measurement data in step S307.

In step S308, the control unit 150 identifies the RSRP measurement value input from the measurement unit 120.

In step S309, the control unit 150 identifies a timer value input from the internal timer 160.

In step S310, the control unit 150 compares the RSRP measurement value identified in step S308 with the RSRP threshold value A. When the RSRP measurement value identified in step S308 exceeds the RSRP threshold value A, the control unit 150 causes the process to proceed to step S315. On the other hand, when the RSRP measurement value identified in step S308 is less than or equal to the RSRP threshold value A, the control unit 150 causes the process to proceed to step S311.

In step S311, the control unit 150 compares the timer value identified in step S309 with the internal timer threshold value A. When the timer value identified in step S309 exceeds the internal timer threshold value A, the control unit 150 causes the process to proceed to step S315. On the other hand, when the timer value identified in step S309 is less than or equal to the internal timer threshold value A, the control unit 150 causes the process to proceed to step S312.

Meanwhile, the control unit 150 compares the RSRP measurement value identified in step S308 with the RSRP threshold value B in step S312. When the RSRP measurement value identified in step S308 exceeds the RSRP threshold value B, the control unit 150 causes the process to return to step S308. On the other hand, when the RSRP measurement value identified in step S308 is less than or equal to the RSRP threshold value B, the control unit 150 causes the process to proceed to step S313.

In step S313, the control unit 150 compares the timer value identified in step S309 with the internal timer threshold value B. When the timer value identified in step S309 exceeds the internal timer threshold value B, the control unit 150 causes the process to return to step S308. On the other hand, when the timer value identified in step S309 is less than or equal to the internal timer threshold value B, the RSRP measurement value rapidly decreases and thus, the control unit 150 causes the process to proceed to step S314.

In step S314, the control unit 150 stores the invalid data presence flag.

In step S315, the control unit 150 ends the measurement and collection. In addition, the control unit 150 ends the record of the measurement data in step S316.

In step S317, the control unit 150 identifies the presence or absence of invalid measurement data depending on the presence or absence of the invalid data presence flag. When the invalid data presence flag is present, that is, when the invalid measurement data is present, the control unit 150 causes the process to proceed to step S318. On the other hand, when the invalid data presence flag is absent, that is, when the invalid measurement data is absent, the control unit 150 causes the process to return to step S301.

In step S318, the control unit 150 deletes all measurement data stored in the storage unit 140. Thereafter, the process returns to step S301. It is noted that a timing at which measurement data is deleted is not limited as long as the timing is prior to a transition from the idle mode to the connected mode.

(4) Effect of Embodiments

As described in the foregoing, according to the present embodiment, the radio terminal UE set to perform Logged MDT performs a control so that all measurement data stored in the storage unit 140 is deleted when a rapid decrease in the RSRP measurement value is detected in the idle mode.

As a result, it is possible, for example, to eliminate a need of reporting, to the E-UTRAN 10, during a transition to the connected mode, the measurement data related to a coverage problem that RSRP rapidly decreases when the radio terminal UE moves into an elevator and the door is closed, and therefore, it is possible to exclude the coverage problem from a target for network optimization.

Accordingly, the radio terminal UE according to the present embodiment can avoid induction of inappropriate network optimization and an increase in load and amount of resource consumption.

In the present embodiment, the predetermined time period corresponding to the internal timer threshold value B is set to a time period shorter than a certain time period corresponding to the internal timer threshold value A. Thus, since a rapid decrease in the RSRP measurement value can be detected before the recording period is ended, it is possible to appropriately suspend the measurement and collection.

(5) Modifications

In the third embodiment described above, the measurement and collection is started after the RSRP measurement value falls below the RSRP threshold value A. However, when measurement data prior to the RSRP measurement value falling below the RSRP threshold value A is needed to be reported to the E-UTRAN 10, the measurement and collection may be performed after step S301 and before step S305.

In the third embodiment described above, the measurement and collection is suspended when the received-signal state is improved before a timeout. However, when the RSRP measurement value exceeds the RSRP threshold value A before the internal timer value exceeds the internal timer threshold value A, the measurement and collection may be continued until the timeout rather than immediately ending the measurement and collection.

In the third embodiment described above, Δt which is a time difference from a time when the RSRP measurement value falls below the RSRP threshold value A to a time when the RSRP measurement value falls below the RSRP threshold value B is acquired using the internal timer 160, and it is determined whether the RSRP measurement value rapidly decreases based on whether Δt is less than or equal to the internal timer threshold value B. However, the invention is not limited to such a criterion for determination, and a slope of change calculated from the amount of change of RSRP in a certain time period may be used as a criterion for determination. For example, it is possible to acquire the amount of decrease in the RSRP measurement value within a certain time period, compare the amount of decrease with a threshold value, and determine that the RSRP measurement value rapidly decreases when the amount of decrease exceeds the threshold value.

In the third embodiment described above, SCBWTT is used as the recording condition. However, in addition to SCB-WTT, another recording condition such as Periodic and Transmit power headroom becomes less than threshold may be used. Periodic is a recording condition on which a record is periodically performed, and Transmit power headroom becomes less than threshold is a recording condition on which a record is performed when a transmission power margin falls below a threshold value.

In the third embodiment described above, an example of a mobile communication system configured based on LTE, standards of which have been designed in 3GPP, is described. However, in addition to LTE, the present invention may be applied to another mobile communication system such as W-CDMA (Wideband Code Division Multiple Access).

Fourth Embodiment

With regard a fourth embodiment of the present invention, (1) Overview of mobile communication system, (2) Configuration of radio terminal, (3) Operation of radio terminal, (4) Effect of embodiments, and (5) Modifications will be sequentially described with reference to drawings.

(1) Overview of Mobile Communication System

FIG. 1 is an entire schematic configuration diagram of a mobile communication system 1 according to the present embodiment. The mobile communication system 1 is configured on the basis of LTE (Long Term Evolution), standards of which have been designed in 3GPP, and supports the above described Logged MDT.

As illustrated in FIG. 1, the mobile communication system 1 includes a radio terminal UE, E-UTRAN (Evolved-UMTS Terrestrial Radio Access Network) 10, a mobile management device MME/gateway device S-GW, and a maintenance monitoring device OAM. The E-UTRAN 10 is a mobile communication network configured by a plurality of base stations eNB.

The radio terminal UE is a transportable radio communication device belonging to a user. The radio terminal UE is configured to connect to one of the base stations eNB constituting the E-UTRAN 10 (including a case of connecting thereto via a relay device, or connecting to a relay device), and enable communication with a communication destination via the base station eNB. A state in which the radio terminal UE is performing communication is referred to as a connected mode, and a state in which the radio terminal UE is standing by is referred to as an idle mode.

Each base station eNB is a fixed radio communication device set up by an operator, and is configured to perform radio communication with the radio terminal UE. Each base station eNB performs communication with the mobile management device MME/gateway device S-GW, and communication with the maintenance monitoring device OAM via a backhaul.

The mobile management device MME is configured to perform various mobility controls for the radio terminal UE, and the gateway device S-GW is configured to perform transfer control of user data transmitted and received by the radio terminal UE.

The maintenance monitoring device OAM is a server device set up by an operator, and is configured to perform maintenance and monitoring of the E-UTRAN 10.

In the present embodiment, for example, the base station eNB which is a connection destination of the radio terminal UE transmits information for setting Logged MDT in the radio terminal UE to the radio terminal UE in response to an instruction from the maintenance monitoring device OAM.

The radio terminal UE set to perform Logged MDT measures and records a received-signal state from the E-UTRAN 10 in the idle mode, and reports measurement data to the E-UTRAN 10 during a transition from the idle mode to the connected mode. Hereinafter, processing of appropriately generating measurement data by the radio terminal UE is referred to as "measurement and collection".

In addition, reference signal received power (RSRP) as an index of a received-signal state is used in the present embodiment. However, reference signal received quality (RSRQ) may be used together with RSRP.

Measurement data includes information related to a measurement result and location information at the time of measurement. For example, the information related to a measurement result is information indicating RSRP for each cell of one or a plurality of base stations eNB. The location information is GPS/GNSS location information when the radio terminal UE has a GPS/GNSS function, and is RF fingerprint information when the radio terminal UE does not have a GPS receiving function.

The base station eNB receiving measurement data from the radio terminal UE transfers the received measurement data to the maintenance monitoring device OAM. If the maintenance monitoring device OAM discovers a coverage problem on the basis of the measurement data acquired in this way, the maintenance monitoring device OAM performs network optimization for notifying an operator of the discovered coverage problem or solving the discovered coverage problem.

When Logged MDT is set in the radio terminal UE, the base station eNB performing the setting may designate various parameters related to Logged MDT. In the present embodiment, the base station eNB performing the setting designates a recording condition (Logging trigger) which is one of parameters of Logged MDT. The recording condition refers to a trigger on the basis of which the radio terminal UE records the measurement data.

There is a certain coverage problem that cannot be resolved, even when normal network optimization is performed, depending on a factor causing RSRP to deteriorate. For example, a problem that RSRP rapidly deteriorates when the radio terminal UE moves into an elevator and the door is closed, may not be resolved even when normal network optimization is performed. Thus, it is preferable that the coverage problem be excluded from a target for network optimization.

Therefore, in the present embodiment, the radio terminal UE set to perform Logged MDT deletes measurement data corresponding to RSRP showing a rapid decrease among recorded measurement data when the rapid decrease in RSRP is detected in the idle mode.

(2) Configuration of Radio Terminal

Figure 11:
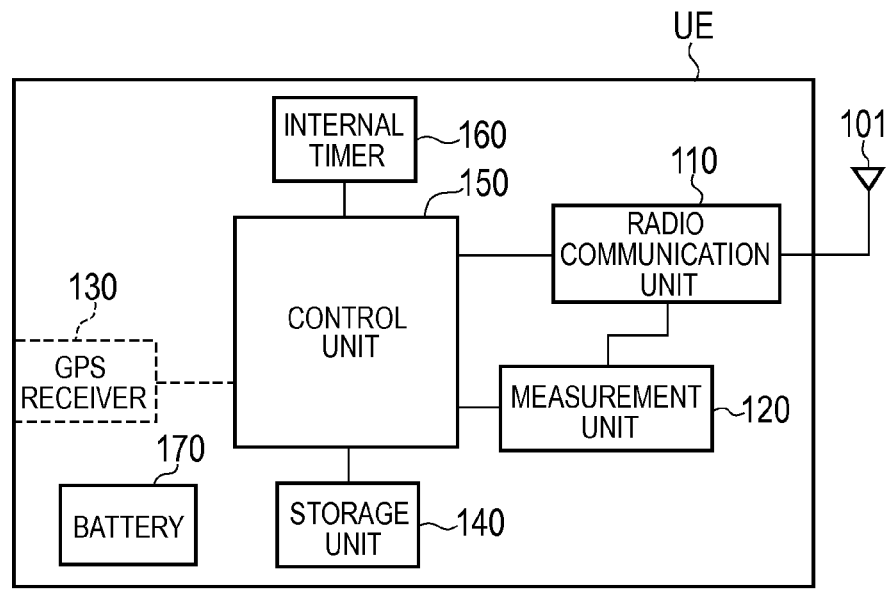
FIG. 11 is a block diagram illustrating a configuration of a radio terminal according to the fourth embodiment.

FIG. 11 is a block diagram illustrating a configuration of the radio terminal UE according to the present embodiment. Herein, an example where the radio terminal UE has a GPS function is described.

As illustrated in FIG. 11, the radio terminal UE includes the antenna 101, the radio communication unit 110, the measurement unit 120, the GPS receiver 130, the storage unit 140, the control unit 150, the internal timer 160, and the battery 170.

The antenna 101 is used for transmitting and receiving a radio signal. The radio communication unit 110, for example, is configured using a radio frequency (RF) circuit or a baseband (BB) circuit, and is configured to perform radio communication through the antenna 101. For transmission, the radio communication unit 110 performs coding and modulation of a transmission signal that is input from the control unit 150, performs up-converting and amplification for the modulated signal, and then outputs the amplified signal to the antenna 101. For reception, the radio communication unit 110 performs amplification and down-converting of a reception signal that is input from the antenna 101, performs demodulation and decoding for the converted signal, and then outputs the demodulated signal to the control unit 150.

The measurement unit 120 measures a received power level, that is, RSRP of a radio signal (specifically, a reference signal) received by the radio communication unit 110 from the E-UTRAN 10, and outputs the measured RSRP (hereinafter, referred to as an "RSRP measurement value") to the control unit 150.

The GPS receiver 130 receives a signal from a GPS satellite, and outputs location information using a GPS to the control unit 150.

For example, the storage unit 140 is configured using a memory, and stores various types of information used for controlling the radio terminal UE. The storage unit 140 stores various threshold values for detecting a rapid decrease in RSRP and the like, and setting information related to Logged MDT. In the present embodiment, the various threshold values include an RSRP threshold value A, an RSRP threshold value B, an internal timer threshold value A, and an internal timer threshold value B. Each threshold value will be specifically described below.

For example, the control unit 150 is configured using a CPU, and controls various functions provided in the radio terminal UE. The control unit 150 performs a control so that measurement data obtained by associating the RSRP measurement value input from the measurement unit 120 with location information input from the GPS receiver 130 is generated, and the generated measurement data is recorded in the storage unit 140 in accordance with the setting information stored in the storage unit 140. Then, the control unit 150 performs a control so that the measurement data recorded in the storage unit 140 is reported to the E-UTRAN 10 from the radio communication unit 110 during a transition from the idle mode to the connected mode.

In the present embodiment, Serving cell becomes worse than threshold (SCBWTT) is used as the recording condition contained in the setting information. SCBWTT as the recoding condition performs a record over a certain time period after the RSRP measurement value for a serving cell falls below the RSRP threshold value A. The certain time period is specified by the internal timer threshold value A.

The internal timer 160 is used when the control unit 150 detects a rapid decrease in RSRP. The internal timer 160 is activated by the control unit 150 when the RSRP measurement value falls below the RSRP threshold value A. After being activated, the internal timer 160 outputs a timer value increasing over time to the control unit 150.

The battery 170 stores power to be provided to each block of the radio terminal UE.

In the radio terminal UE configured as above, the control unit 150 detects a rapid decrease in the RSRP measurement value from the measurement unit 120 by using the timer value input from the internal timer 160 and the various threshold values stored in the storage unit 140 during the execution of Logged MDT.

In the present embodiment, the rapid decrease in the RSRP measurement value indicates that the RSRP measurement value decreases by a predetermined amount corresponding to a difference between the RSRP threshold value A and the RSRP threshold value B within a predetermined time period corresponding to the internal timer threshold value B. Herein, the predetermined time period corresponding to the internal timer threshold value B is set to a time period shorter than a certain time period corresponding to the internal timer threshold value A.

Further, when a rapid decrease in RSRP measurement value is detected, the control unit 150 performs a control so that measurement data corresponding to RSRP showing the rapid decrease is deleted among measurement data recorded in the storage unit 140.

The measurement data corresponding to RSRP showing a rapid decrease refers to, for example, measurement data acquired during a time period from when the measurement and collection is started as a result of the RSRP measurement value falling below the RSRP threshold value A until the measurement and collection is ended.

Figure 12:
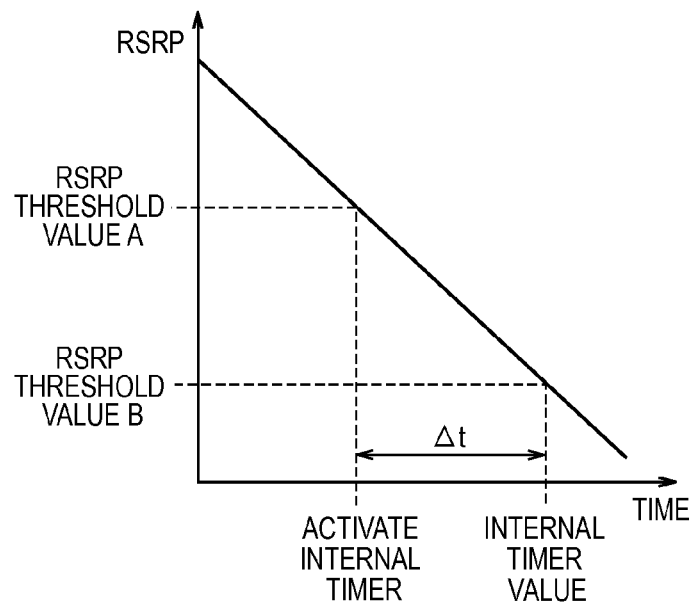
FIG. 12 is a diagram illustrating an operation of detecting a rapid decrease in RSRP.

FIG. 12 is a diagram illustrating an operation for detecting a rapid decrease in the RSRP measurement value. FIG. 3 illustrates a state in which RSRP monotonously decreases over time to describe a concept of detection.

As illustrated in FIG. 12, the control unit 150 detects a rapid decrease in RSRP by using Δt which is a time difference from a time when the RSRP measurement value falls below the RSRP threshold value A to a time when the RSRP measurement value falls below the RSRP threshold value B.

The control unit 150 measures Δt by activating the internal timer 160 when RSRP measurement value falls below the RSRP threshold value A, and identifying a timer value of the internal timer 160 when the RSRP measurement value falls below the RSRP threshold value B. When Δt is less than or equal to the RSRP threshold value B, it is possible to determine that RSRP rapidly decreases.

(3) Operation of Radio Terminal

Figure 13:
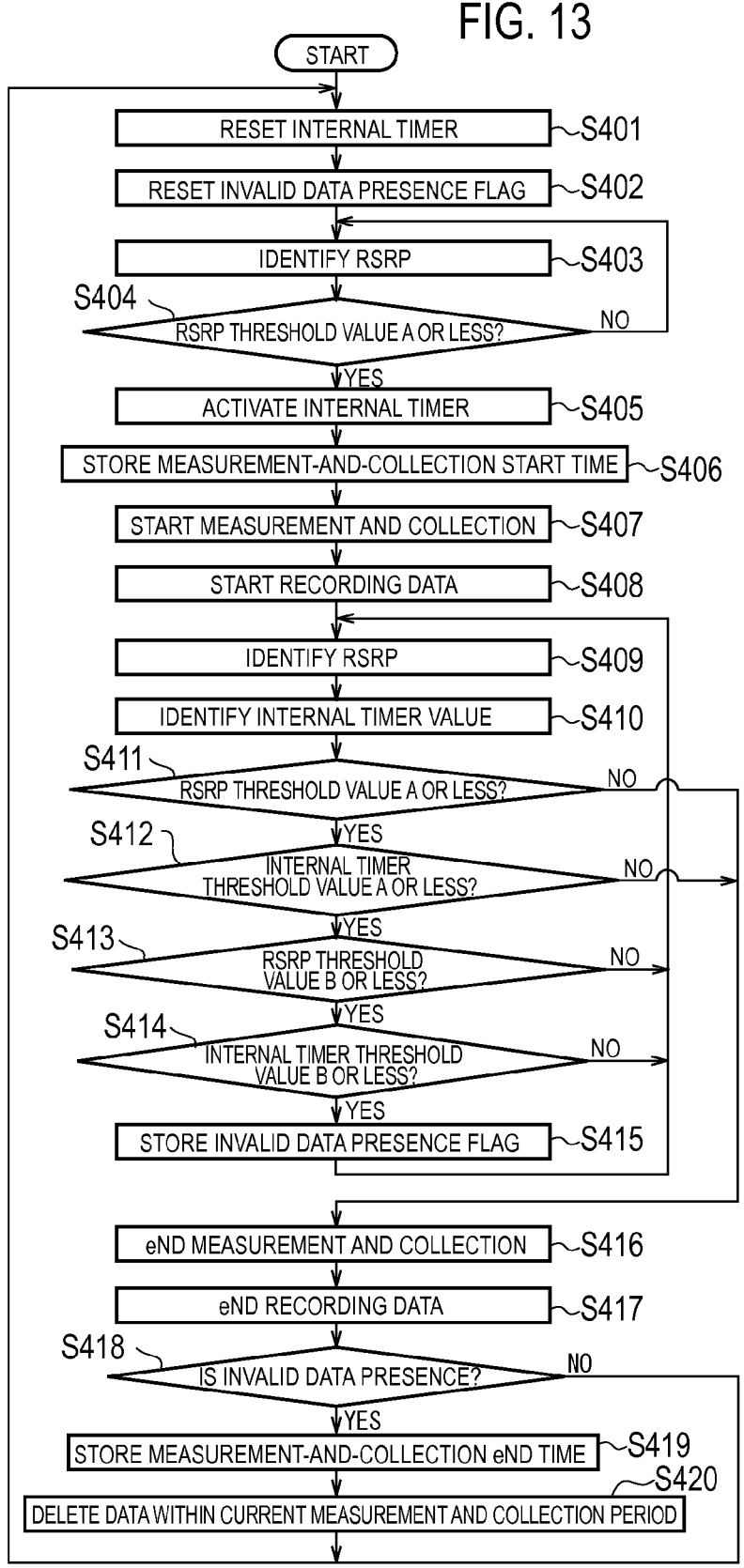
FIG. 13 is a flowchart illustrating an operation of a radio terminal according to the fourth embodiment.

FIG. 13 is a flowchart illustrating an operation of the radio terminal UE according to the present embodiment. The flow is started in response to a transition to the idle mode after the radio terminal UE is set to perform Logged MDT from the E-UTRAN 10. First, in response to the flow started, the control unit 150 controls the measurement unit 120 so that RSRP is continuously measured.

As illustrated in FIG. 13, the control unit 150 resets the internal timer 160 in step S401.

In step S402, the control unit 150 resets an invalid data presence flag. The invalid data presence flag is a flag for designating invalid measurement data.

In step S403, the control unit 150 identifies the RSRP measurement value input from the measurement unit 120.

In step S404, the control unit 150 compares the RSRP measurement value identified in step S403 with the RSRP threshold value A. When the RSRP measurement value identified in step S403 exceeds the RSRP threshold value A, the control unit 150 causes the process to return to step S403. On the other hand, when the RSRP measurement value identified in step S403 is less than or equal to the RSRP threshold value A, the control unit 150 causes the process to proceed to step S405.

In step S405, the control unit 150 activates the internal timer 160.

In step S406, the control unit 150 stores a measurement-and-collection start time. Specifically, the control unit 150 has a clock function for acquiring a current time, acquires the measurement-and-collection start time using the clock function, and stores the acquired measurement-and-collection start time. In addition, the control unit 150 starts the measurement and collection in step S407. Further, the control unit 150 starts recording the measurement data in step S408.

In step S409, the control unit 150 identifies the RSRP measurement value input from the measurement unit 120.

In step S410, the control unit 150 identifies the timer value input from the internal timer 160.

In step S411, the control unit 150 compares the RSRP measurement value identified in step S409 with the RSRP threshold value A. When the RSRP measurement value identified in step S409 exceeds the RSRP threshold value A, the control unit 150 causes the process to proceed to step S416. On the other hand, when the RSRP measurement value identified in step S409 is less than or equal to the RSRP threshold value A, the control unit 150 causes the process to proceed to step S412.

In step S412, the control unit 150 compares the timer value identified in step S410 with the internal timer threshold value A. When the timer value identified in step S410 exceeds the internal timer threshold value A, the control unit 150 causes the process to proceed to step S416. On the other hand, when the timer value identified in step S410 is less than or equal to the internal timer threshold value A, the control unit 150 causes the process to proceed to step S413.

Meanwhile, the control unit 150 compares the RSRP measurement value identified in step S409 with the RSRP threshold value B in step S413. When the RSRP measurement value identified in step S409 exceeds the RSRP threshold value B, the control unit 150 causes the process to return to step S409. On the other hand, when the RSRP measurement value identified in step S409 is less than or equal to the RSRP threshold value B, the control unit 150 causes the process to proceed to step S414.

In step S414, the control unit 150 compares the timer value identified in step S410 with the internal timer threshold value B. When the timer value identified in step S410 exceeds the internal timer threshold value B, the control unit 150 causes the process to return to step S409. On the other hand, when the timer value identified in step S410 is less than or equal to the internal timer threshold value B, the RSRP measurement value rapidly decreases and thus, the control unit 150 causes the process to proceed to step S415.

In step S415, the control unit 150 stores the invalid data presence flag.

In step S416, the control unit 150 ends the measurement and collection. In addition, the control unit 150 ends a record of the measurement data in step S417.

In step S418, the control unit 150 identifies the presence or absence of invalid measurement data depending on the presence or absence of the invalid data presence flag. When the invalid data presence flag is present, that is, when the invalid measurement data is present, the control unit 150 causes the process to proceed to step S419. On the other hand, when the invalid data presence flag is absent, that is, when the invalid measurement data is absent, the control unit 150 causes the process to return to step S401.

In step S419, the control unit 150 stores a measurement-and-collection end time. Specifically, the control unit 150 acquires a measurement-and-collection end time using a clock function, and stores the acquire measurement-and-collection end time.

In step S420, the control unit 150 deletes measurement data acquired during a period from the measurement-and-collection start time stored in step S406 to the measurement-and-collection end time stored in step S419 among measurement data stored in the storage unit 140. It is noted that a timing at which measurement data is deleted is not limited as long as the timing is prior to a transition from the idle mode to the connected mode.

(4) Effect of Embodiments

As described in the foregoing, according to the present embodiment, the radio terminal UE set to perform Logged MDT performs a control so that measurement data corresponding to RSRP showing a rapid decrease is deleted among measurement data stored in the storage unit 140 when the rapid decrease in the RSRP measurement value is detected in the idle mode.

As a result, it is possible, for example, to eliminate a need of reporting, to the E-UTRAN 10, during a transition to the connected mode, the measurement data related to a coverage problem that RSRP rapidly decreases when the radio terminal UE moves into an elevator and the door is closed, and therefore, it is possible to exclude the coverage problem from a target for network optimization.

Accordingly, the radio terminal UE according to the present embodiment can avoid induction of inappropriate network optimization and an increase in load and amount of resource consumption.

In the present embodiment, the predetermined time period corresponding to the internal timer threshold value B is set to a time period shorter than a certain time period corresponding to the internal timer threshold value A. Thus, since a rapid decrease in the RSRP measurement value can be detected before the recording period is ended, it is possible to appropriately suspend the measurement and collection.

(5) Modifications

In the fourth embodiment described above, the measurement-and-collection start time and the measurement-and-collection end time are stored, and measurement data acquired between the both times are designated as a target for deletion. However, the invention is not limited to a case of storing the measurement-and-collection start time and the measurement-and-collection end time. After a measurement-and-collection start ID is recorded in the storage unit 140, measurement data may be recorded in the storage unit 140, and then a measurement-and-collection end ID may be recorded in the storage unit 140, thereby designating measurement data between the both IDs as a target for deletion.

In the fourth embodiment described above, the measurement and collection are started after the RSRP measurement value falls below the RSRP threshold value A. However, when measurement data prior to the RSRP measurement value falling below the RSRP threshold value A is needed to be reported to the E-UTRAN 10, the measurement and collection may be performed after step S401 and before step S407.

In the fourth embodiment described above, the measurement and collection is suspended when a received-signal state is improved before the timeout. However, when the RSRP measurement value exceeds the RSRP threshold value A before the internal timer value exceeds the internal timer threshold value A, the measurement and collection may be continued until the timeout rather than immediately ending the measurement and collection.

In the fourth embodiment described above, Δt which is a time difference from a time when the RSRP measurement value falls below the RSRP threshold value A to a time when the RSRP measurement value falls below the RSRP threshold value B is acquired using the internal timer 160, and it is determined whether the RSRP measurement value rapidly decreases based on whether Δt is less than or equal to the internal timer threshold value B. However, the invention is not limited to such a criterion for determination, and a slope of change calculated from the amount of change of RSRP in a certain time period may be used as a criterion for determination. For example, it is possible to acquire the amount of decrease in the RSRP measurement value within a certain time period, compare the amount of decrease with a threshold value, and determine that the RSRP measurement value rapidly decreases when the amount of decrease exceeds the threshold value.

In the fourth embodiment described above, SCBWTT is used as the recording condition. However, in addition to SCB-WTT, another recording condition such as Periodic and Transmit power headroom becomes less than threshold may be used. Periodic is a recording condition on which a record is periodically performed, and Transmit power headroom becomes less than threshold is a recording condition on which a record is performed when a transmission power margin falls below a threshold value.

In the fourth embodiment described above, an example of a mobile communication system configured based on LTE, standards of which have been designed in 3GPP, is described. However, in addition to LTE, the present invention may be applied to another mobile communication system such as W-CDMA (Wideband Code Division Multiple Access).

In addition, the entire content of Japanese Patent Application No. 2011-050585 (filed on Mar. 8, 2011), Japanese Patent Application No. 2011-050588 (filed on Mar. 8, 2011), Japanese Patent Application No. 2011-050611 (filed on Mar. 8, 2011), and Japanese Patent Application No. 2011-050613 (filed on Mar. 8, 2011) are incorporated in the present specification by reference.

INDUSTRIAL APPLICABILITY

As described in the foregoing, the radio terminal and the control method according to the present invention can avoid induction of inappropriate network optimization and an increase in load and amount of resource consumption, and thus, are useful for a radio communication field.

The invention claimed is:

1. A radio terminal comprising:
    a radio communication unit capable of performing radio communication with a mobile communication network;
    a measurement unit that measures a received-signal state from the mobile communication network; and
    a control unit that performs a control so that measurement data including information related to the received-signal state measured by the measurement unit and location information at the time of measurement is reported to the mobile communication network, wherein
    when a rapid change of the received-signal state measured by the measurement unit is detected, the control unit performs control so that measurement data corresponding to the received-signal state indicating the rapid change is excluded from a target to be reported to the mobile communication network.

2. The radio terminal according to claim 1, wherein the rapid change of the received-signal state indicates that a power level of a reception signal from the mobile communication network decreases by a predetermined amount within a predetermined time period.

3. The radio terminal according to claim 2, wherein
    the control unit performs a control so that the measurement data is reported to the mobile communication network when a reporting condition is satisfied,
    the reporting condition is that a time period at which the power level of the reception signal is below a threshold value exceeds a certain time period, and
    the predetermined time period is shorter than the certain time period.

4. The radio terminal according to claim 2, wherein the control unit performs a control so that a state in which the report of the measurement data to the mobile communication network is suspended is continued after the power level of the reception signal decreases by the predetermined amount within the predetermined time period until the power level of the reception signal exceeds a threshold value.

5. The radio terminal according to claim 1, wherein the measurement of the received-signal state and the report of the measurement data are performed in a state in which the radio terminal is performing communication.

6. The radio terminal according to claim 1, further comprising a storage unit, wherein
    the control unit performs a control so that the measurement data including information related to the received-signal state measured by the measurement unit and location information at the time of measurement is recorded in the storage unit, and then the measurement data recorded in the storage unit is reported to the mobile communication network, and
    when a rapid change of the received-signal state measured by the measurement unit is detected, the control unit excludes measurement data corresponding to the received-signal state indicating the rapid change, from a target to be recorded in the storage unit.

7. The radio terminal according to claim 6, wherein the rapid change of the received-signal state indicates that a power level of a reception signal from the mobile communication network decreases by a predetermined amount within a predetermined time period.

8. The radio terminal according to claim 7, wherein
the control unit performs a control so that the measurement data is recorded in the storage unit when a recording condition is satisfied,
the recording condition is a completion of measurement over a certain time period after a power level of the reception signal falls below a threshold value, and
the predetermined time period is shorter than the certain time period.

9. The radio terminal according to claim 7, wherein the control unit performs a control so that a state in which the record of the measurement data in the storage unit is suspended is continued after the power level of the reception signal decreases by the predetermined amount within the predetermined time period until the power level of the reception signal exceeds a threshold value.

10. The radio terminal according to claim 6, wherein the measurement of the received-signal state and the record of the measurement data are performed in a standby state of the radio terminal.

11. The radio terminal according to claim 1, further comprising a storage unit, wherein
the control unit performs a control so that the measurement data including information related to the received-signal state measured by the measurement unit and location information at the time of measurement is recorded in the storage unit, and then the measurement data recorded in the storage unit is reported to the mobile communication network, and
when a rapid change of the received-signal state measured by the measurement unit is detected, the control unit deletes all measurement data recorded in the storage unit.

12. The radio terminal according to claim 11, wherein the rapid change of the received-signal state indicates that a power level of a reception signal from the mobile communication network decreases by a predetermined amount within a predetermined time period.

13. The radio terminal according to claim 12, wherein
the control unit performs a control so that the measurement data is recorded in the storage unit in accordance with a recording condition,
the recording condition is that a record is performed over a certain time period after a power level of the reception signal falls below a threshold value, and
the predetermined time period is shorter than the certain time period.

14. The radio terminal according to claim 11, wherein the measurement of the received-signal state and the record of the measurement data are performed in a standby state of the radio terminal.

15. The radio terminal according to claim 1, further comprising a storage unit, wherein
the control unit performs a control so that the measurement data including information related to the received-signal state measured by the measurement unit and location information at the time of measurement is recorded in the storage unit, and then the measurement data recorded in the storage unit is reported to the mobile communication network, and
when a rapid change of the received-signal state measured by the measurement unit is detected, the control unit deletes measurement data corresponding to the received-signal state indicating the rapid change among measurement data recorded in the storage unit.

16. The radio terminal according to claim 15, wherein the rapid change of the received-signal state indicates that a power level of a reception signal from the mobile communication network decreases by a predetermined amount within a predetermined time period.

17. The radio terminal according to claim 16, wherein
the control unit performs a control so that the measurement data is recorded in the storage unit in accordance with a recording condition,
the recording condition is that a record is performed over a certain time period after a power level of the reception signal falls below a threshold value, and
the predetermined time period is shorter than the certain time period.

18. The radio terminal according to claim 15, wherein the measurement of the received-signal state and the record of the measurement data are performed in a standby state of the radio terminal.

19. A control method of controlling a radio terminal with which it is possible to perform radio communication with a mobile communication network, the control method comprising:
a measurement step of measuring a received-signal state from the mobile communication network; and
a control step of performing a control so that measurement data including information related to a received-signal state measured in the measurement step and location information at the time of the measurement is reported to the mobile communication network, wherein
the control step includes:
an exclusion step of performing a control so that measurement data corresponding to a received-signal state indicating a rapid change is excluded from a target to be reported to the mobile communication network when the rapid change of the received-signal state measured in the measurement step is detected.

20. The control method according to claim 19, wherein
the control step includes:
a recording step of recording the measurement data including information related to a received-signal state measured in the measurement step and location information at the time of the measurement; and
a reporting step of reporting the measurement data recorded in the recording step to the mobile communication network; and
the exclusion step includes:
a step of excluding measurement data corresponding to a received-signal state indicating a rapid change, from a target to be recorded in the recording step, when the rapid change of the received-signal state measured in the measurement step is detected.

21. The control method according to claim 19, wherein
the control step includes:
a recording step of recording the measurement data including information related to a received-signal state measured in the measurement step and location information at the time of the measurement; and
a reporting step of reporting the measurement data recorded in the recording step to the mobile communication network; and the exclusion step includes:
a step of deleting all measurement data recorded in the recording step when a rapid change of the received-signal state measured in the measurement step is detected.

22. The control method according to claim 19, wherein the control step includes:
a recording step of recording the measurement data including information related to a received-signal state measured in the measurement step and location information at the time of the measurement; and
a reporting step of reporting the measurement data recorded in the recording step to the mobile communication network; and
the exclusion step includes:
a step of deleting measurement data corresponding to a received-signal state indicating a rapid change among measurement data recorded in the recording step when the rapid change of the received-signal state measured in the measurement step is detected.

* * * * *